US009441993B2

(12) United States Patent
McGill, Sr.

(10) Patent No.: US 9,441,993 B2
(45) Date of Patent: Sep. 13, 2016

(54) FLOW MEASUREMENT SYSTEMS AND METHODS FOR GAS AND LIQUID APPLICATIONS

(71) Applicant: The Board of Regents of the University System of Georgia, Atlanta, GA (US)

(72) Inventor: Kenneth Charles McGill, Sr., Milledgeville, GA (US)

(73) Assignee: The Board of Regents of the University System of Georgia, Atlanta, GA (US)

( * ) Notice: Subject to any disclaimer, the term of this patent is extended or adjusted under 35 U.S.C. 154(b) by 695 days.

(21) Appl. No.: 13/828,942

(22) Filed: Mar. 14, 2013

(65) Prior Publication Data
US 2014/0278154 A1    Sep. 18, 2014

(51) Int. Cl.
| G01F 1/74 | (2006.01) |
| G01F 1/05 | (2006.01) |
| G01F 1/20 | (2006.01) |
| G01F 1/86 | (2006.01) |
| G01F 1/66 | (2006.01) |

(52) U.S. Cl.
CPC ............... *G01F 1/667* (2013.01); *G01F 1/666* (2013.01)

(58) Field of Classification Search
CPC ....................................... G01F 1/666
USPC ................. 702/45, 47, 48, 50, 56, 100, 190; 73/736
See application file for complete search history.

(56) References Cited

U.S. PATENT DOCUMENTS

| 2004/0069069 | A1* | 4/2004 | Gysling | .................. G01F 1/666 73/736 |
| 2008/0208483 | A1* | 8/2008 | Loose | ..................... G01F 1/666 702/22 |

\* cited by examiner

*Primary Examiner* — Gregory J Toatley
*Assistant Examiner* — Felix Suarez
(74) *Attorney, Agent, or Firm* — Meunier Carlin & Curfman LLC

(57) ABSTRACT

A system for measuring the superposition of a plurality of sound waves propagating within a conduit containing a fluid having a plurality of transducers positioned substantially parallel to the flow direction along the wall of the conduit. The system includes means for modeling the superposition of a plurality of sound waves as they propagate within the conduit.

20 Claims, 21 Drawing Sheets

FLOW MEASUREMENT SYSTEMS AND METHODS FOR GAS AND LIQUID APPLICATIONS

FIELD

This invention relates to a system and method for measuring the phases of sound waves. More specifically, this invention relates to a system and method for measuring the superposition of multiple sound waves as they propagate through a fluid within a conduit.

BACKGROUND

There are a variety of known techniques for measuring flow through a conduit by the measurement of up-field and down-field speeds of a propagating sound wave. However, these known methods are ineffective unless the up-field sound waves can be separated from the down-field sound waves.

More recently, slightly different approaches have been proposed to address the limitations of conventional flow measurement techniques to model sound waves within a conduit. One such approach is described in U.S. Pat. No. 7,725,270. According to this approach, it is assumed that the measured sound wave is a free (unbound) sound wave propagating in a linear fashion. Thus, this approach ignores the reality that sound waves are actually bound by the conduit and that the sound waves travel in three dimensions. By simplifying the modeling of the sound waves, only an approximate model of the flow of the sound waves can be produced.

Thus, there is a need in the pertinent art for a system and method that are capable of accurately measuring the velocity of fluid flow and the speed of sound within a conduit. Additionally, there is a need in the pertinent art for a system and method that are capable of accurately modeling the phases of sound waves propagating through a fluid within a conduit, while taking the presence of the conduit into account. Further, there is a need in the pertinent art for a system and method that are capable of accurately modeling the superposition of multiple sound waves as they propagate through a fluid within a conduit.

SUMMARY

In one embodiment, the invention comprises a system for measuring the superposition of a plurality of sound waves propagating within a conduit containing a fluid. In this embodiment, the conduit has an external surface, and the fluid flows through the conduit in a flow direction. In one aspect, the plurality of sound waves includes at least two sound waves.

In one aspect, the system for measuring the superposition of the plurality of sound waves includes a plurality of transducers positioned substantially parallel to the flow direction along the external surface of the conduit. In an additional aspect, the system for measuring the superposition of the plurality of sound waves includes means for modeling the superposition of the plurality of sound waves as they propagate within the conduit.

In a further aspect, the means for modeling the superposition of the plurality of sound waves is configured to receive a data set from each transducer indicative of the velocity of fluid flow through the conduit and the speed at which the sound waves propagate through the fluid. Upon storage of a selected number of data sets, the means for modeling the superposition of the plurality of sound waves is configured to process an array of data sets to produce a model of the superposition of the plurality of sound waves as they propagate within the conduit. In one aspect, the means for modeling the superposition of the plurality of sound waves processes the array of data sets by performing a one-dimensional fast Fourier transform on the array of data sets. In this aspect, the means for modeling the superposition of the plurality of sound waves can use the results of the one-dimensional fast Fourier transform to generate a normalized time domain signal for each respective transducer. The means for modeling the superposition of the plurality of sound waves can then produce a two-dimensional time and space domain matrix based on the array of data sets and the normalized time domain signals of each transducer. The means for modeling the superposition of the plurality of sound waves can then perform a two-dimensional fast Fourier transform on the two-dimensional time and space domain matrix. The results of the two-dimensional fast Fourier transform can then be correlated with a wave equation that models the superposition of the plurality of sound waves. Based on this correlation, the speed of the sound waves with and against the flow of the fluid can be determined. Based on the determined speed of the sound waves with and against the flow of the fluid, the fluid flow velocity and speed of sound within the conduit can be determined.

DETAILED DESCRIPTION OF THE FIGURES

These and other features of the preferred embodiments of the invention will become more apparent in the detailed description in which reference is made to the appended drawings wherein:

FIG. 3 also schematically depicts the communication between the processor and the plurality of transducers as described herein.

Figure 6:
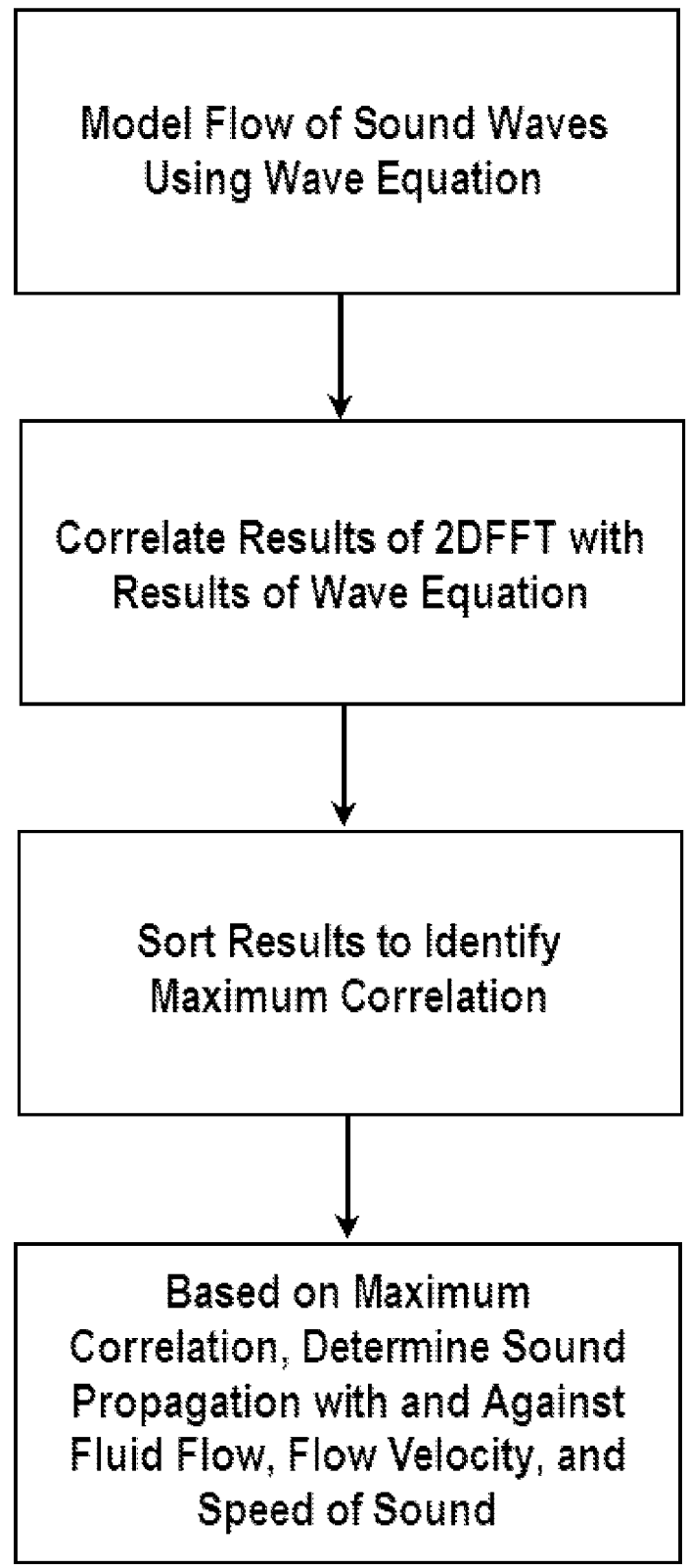

FIG. 6 depicts an exemplary method of correlating the two-dimensional fast Fourier transform data to a flow model equation for Left-to-Right and Right-to-Left propagating waves as described herein. FIG. 6 also depicts the use of the results of the correlation to determine sound propagation with and against the flow of the fluid, the fluid flow velocity, and the speed of sound within the fluid within the conduit.

Figure 7:
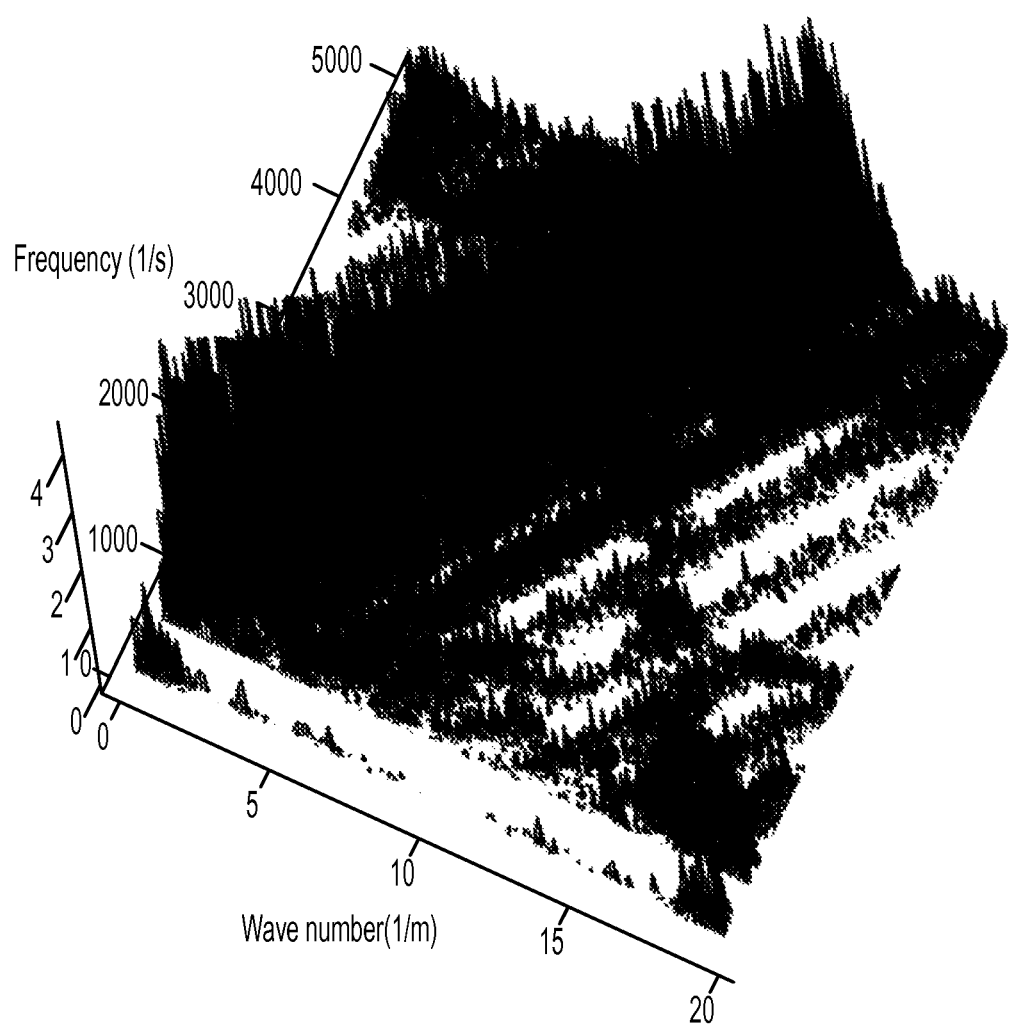
Figure 8:
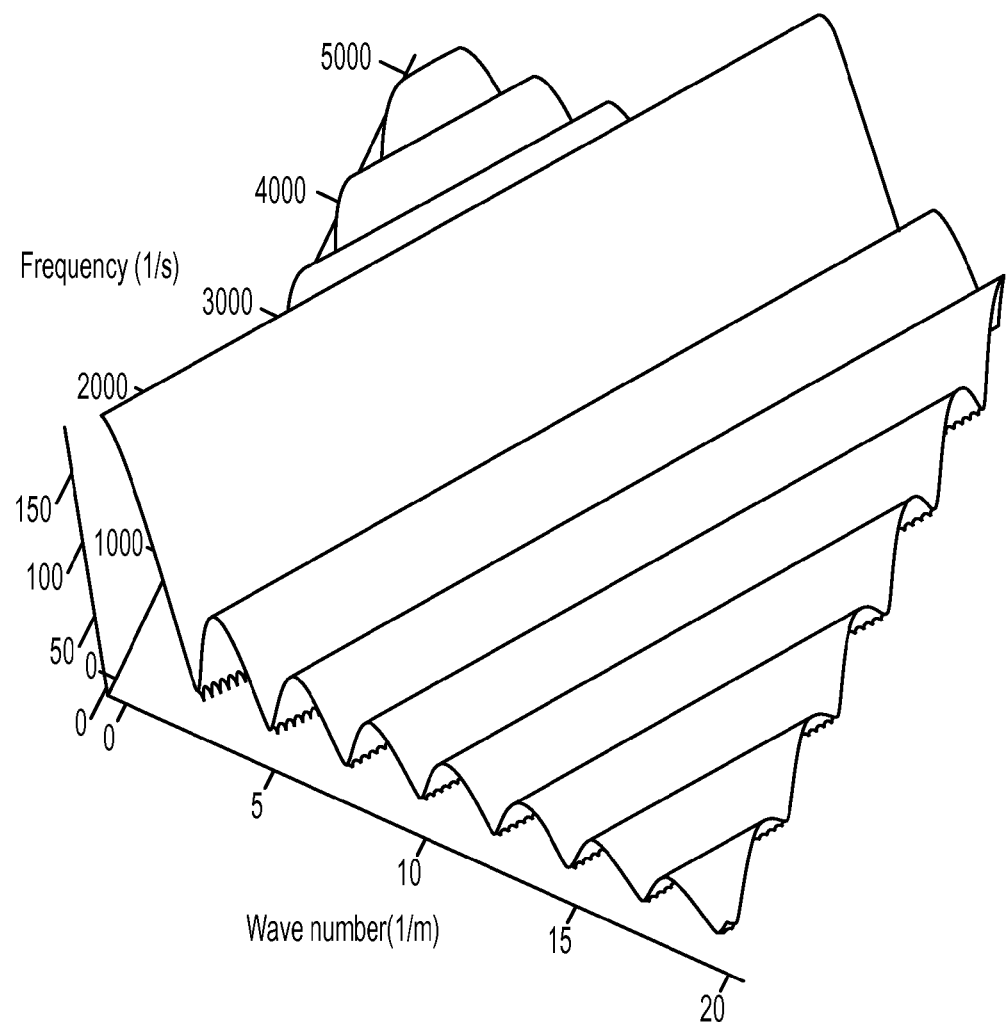
Figure 9:
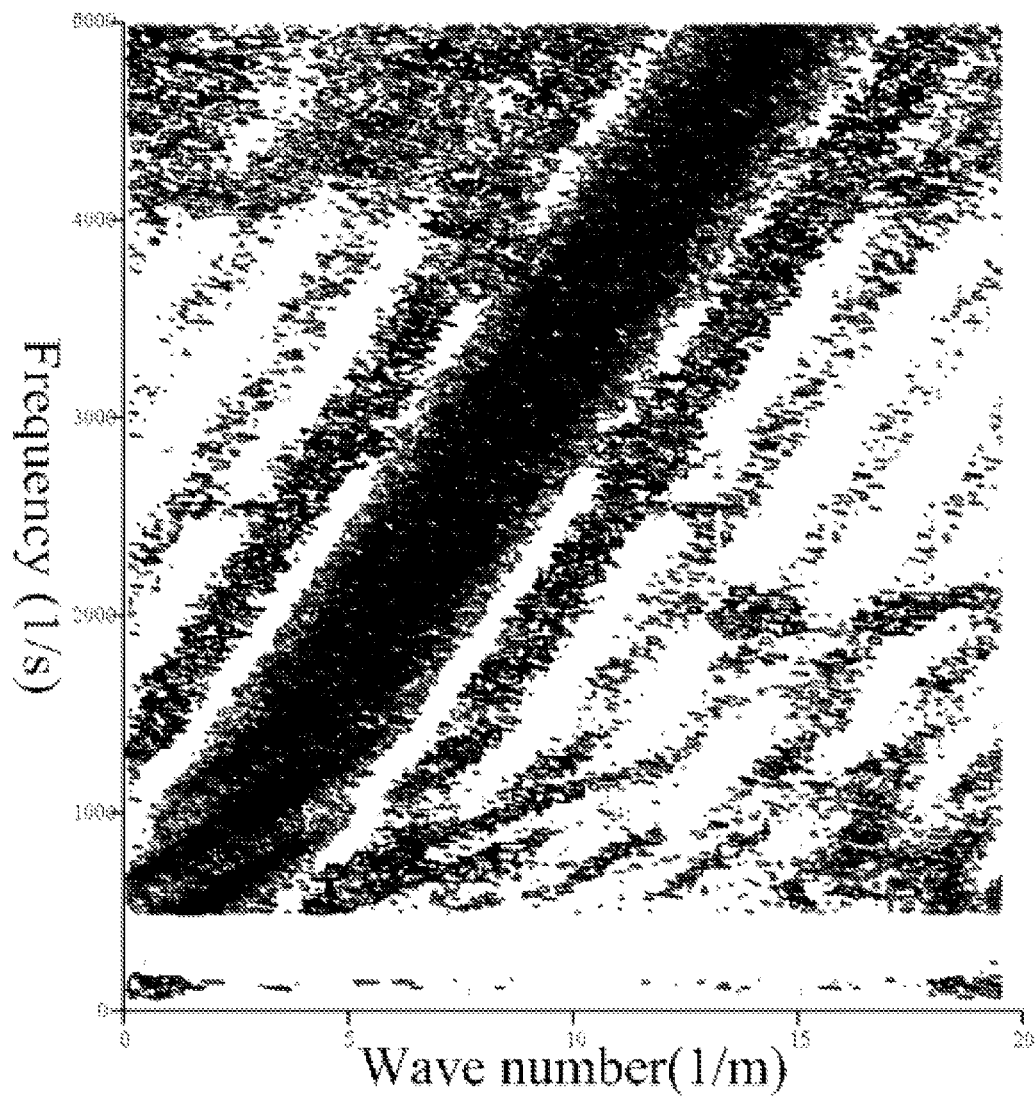

FIGS. 7-9 depict the experimental application of the methods described herein to model the propagation of left-to-right sound waves. FIG. 7 depicts a two-dimensional fast Fourier transform of the sound waves. FIG. 8 depicts a theoretical surface plot for the sound wave. FIG. 9 depicts a contour plot of FIG. 7.

Figure 10:
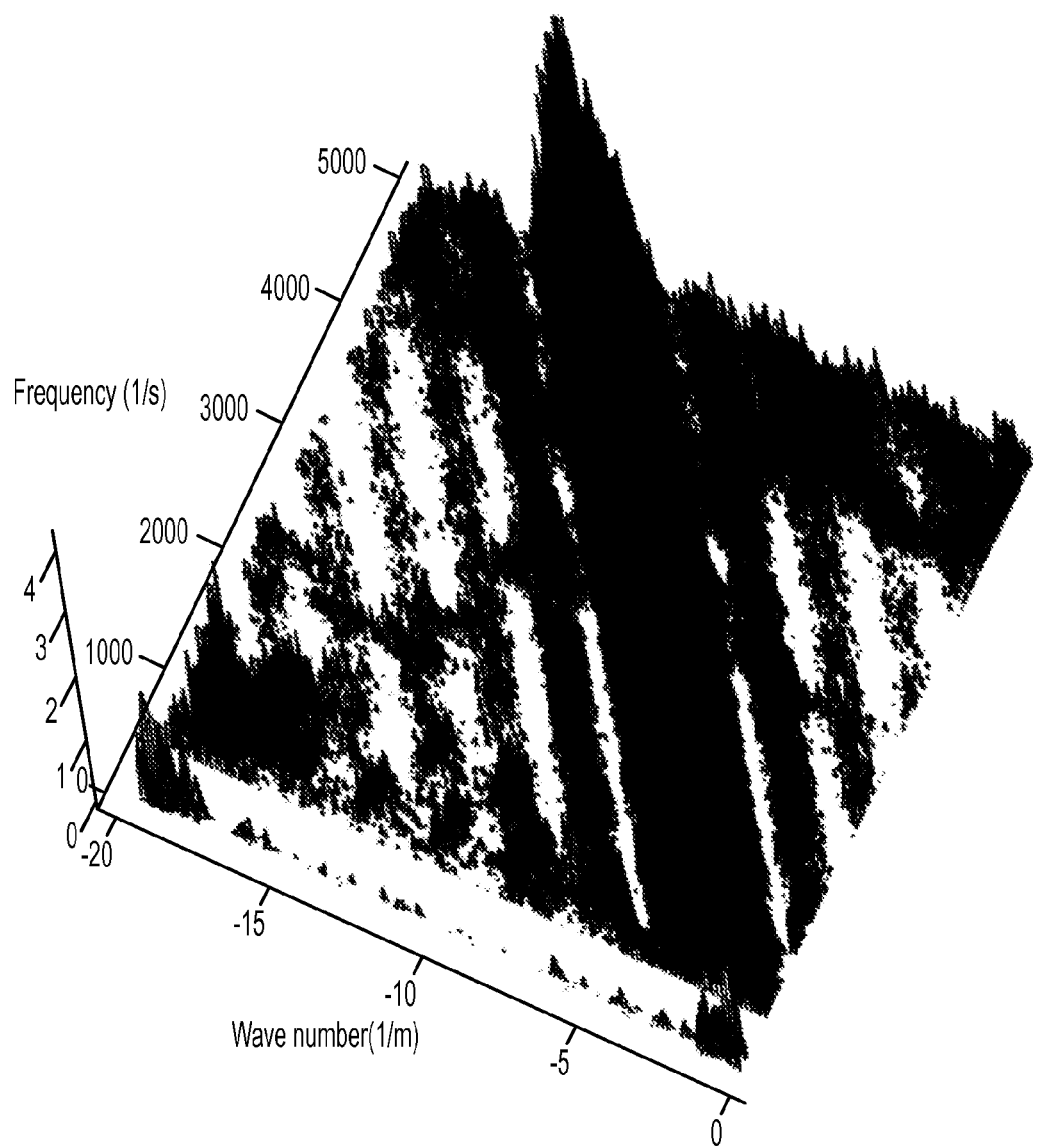
Figure 11:
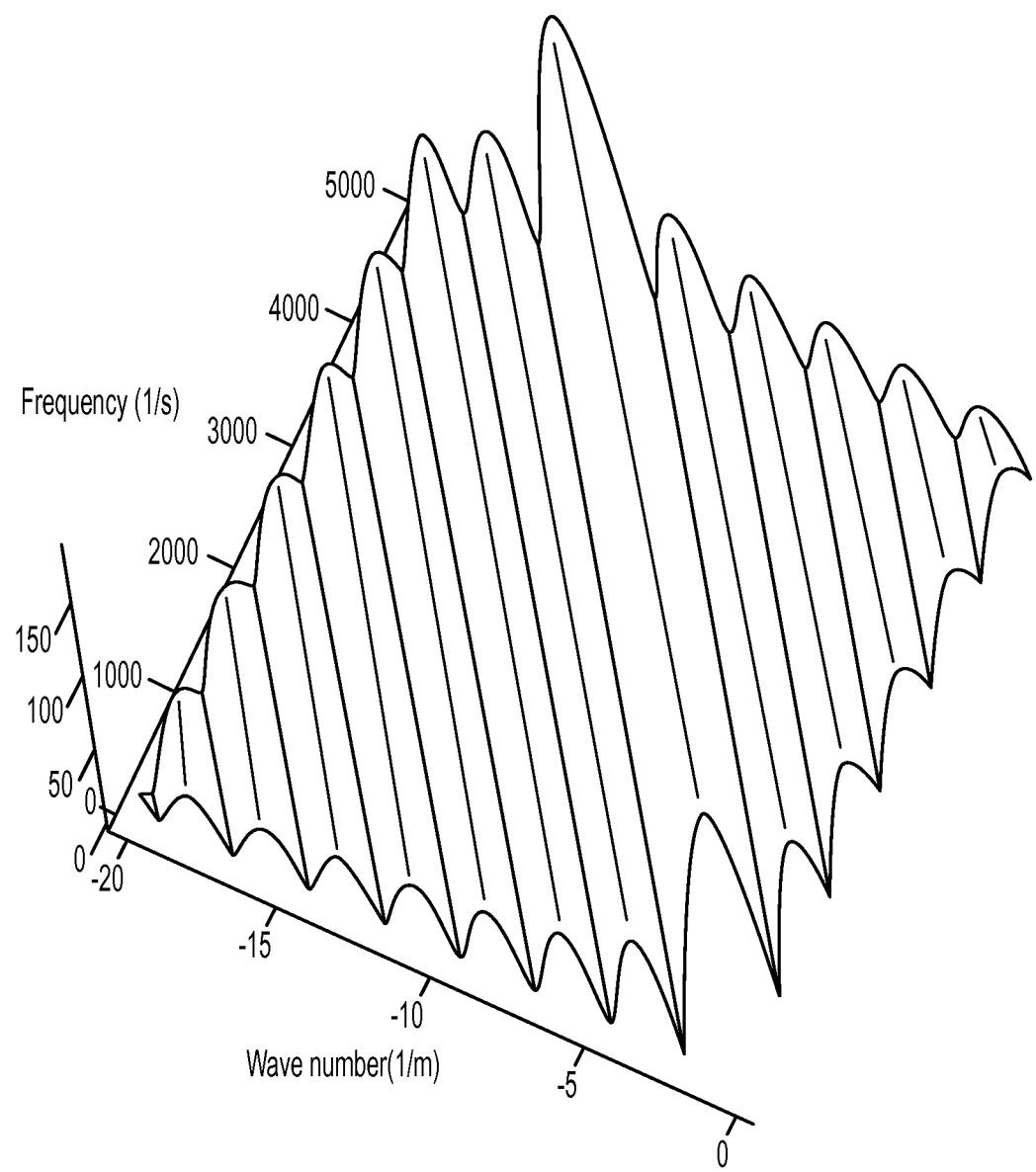
Figure 12:
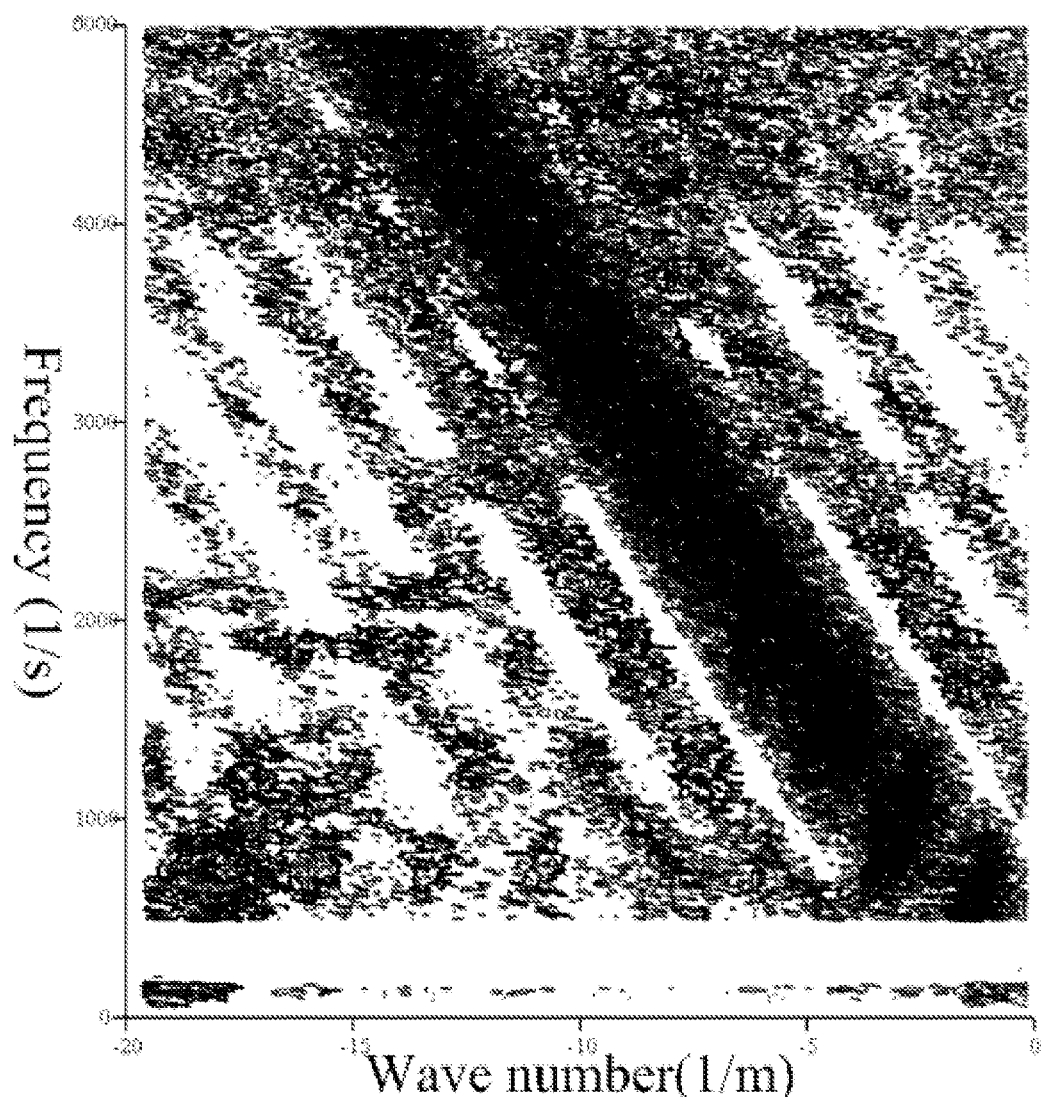

FIGS. 10-12 depict the experimental application of the methods described herein to model the propagation of right-to-left sound waves. FIG. 10 depicts a two-dimensional fast Fourier transform of the sound waves. FIG. 11 depicts a theoretical surface plot for the sound wave. FIG. 12 depicts a contour plot of FIG. 10.

Figure 13:
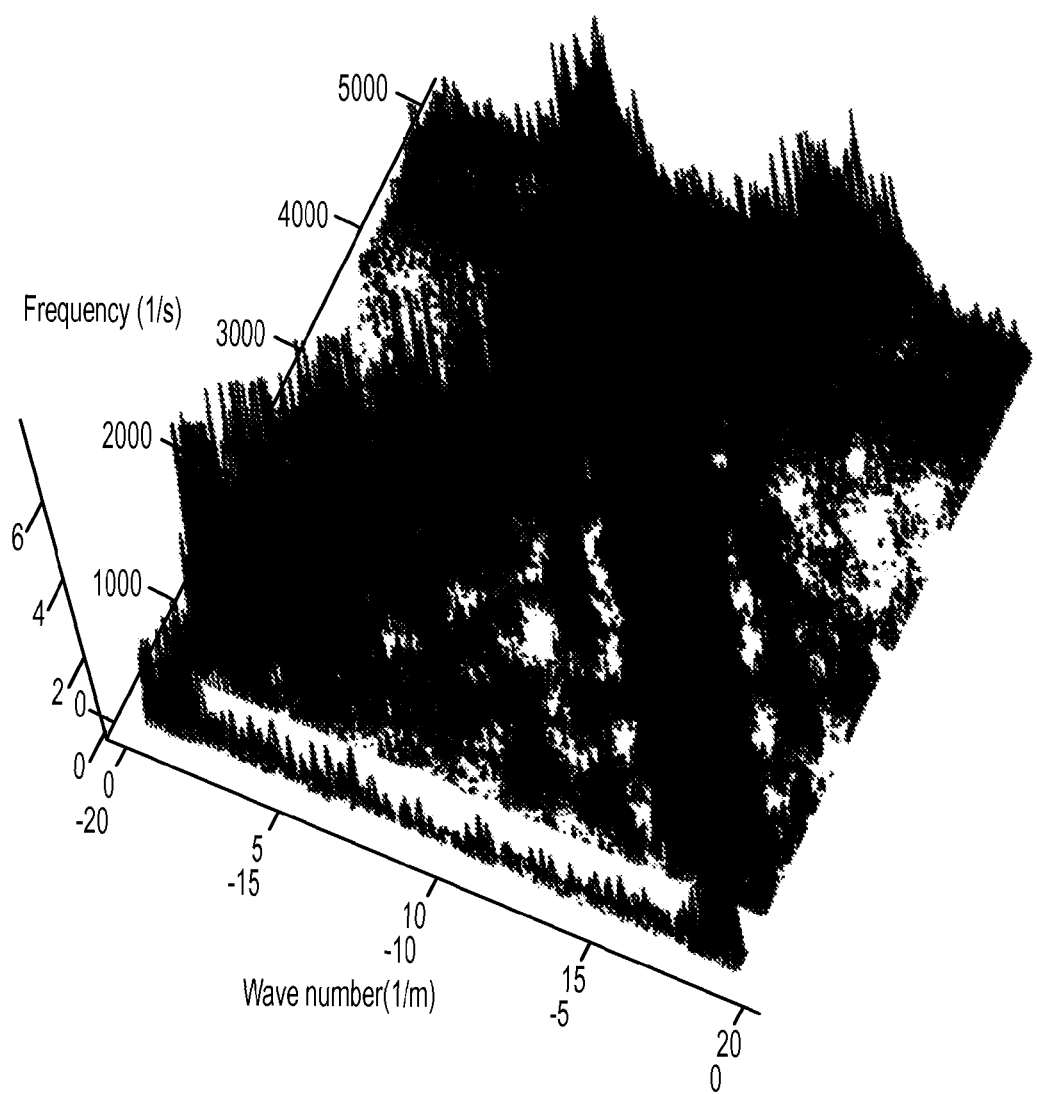
Figure 14:
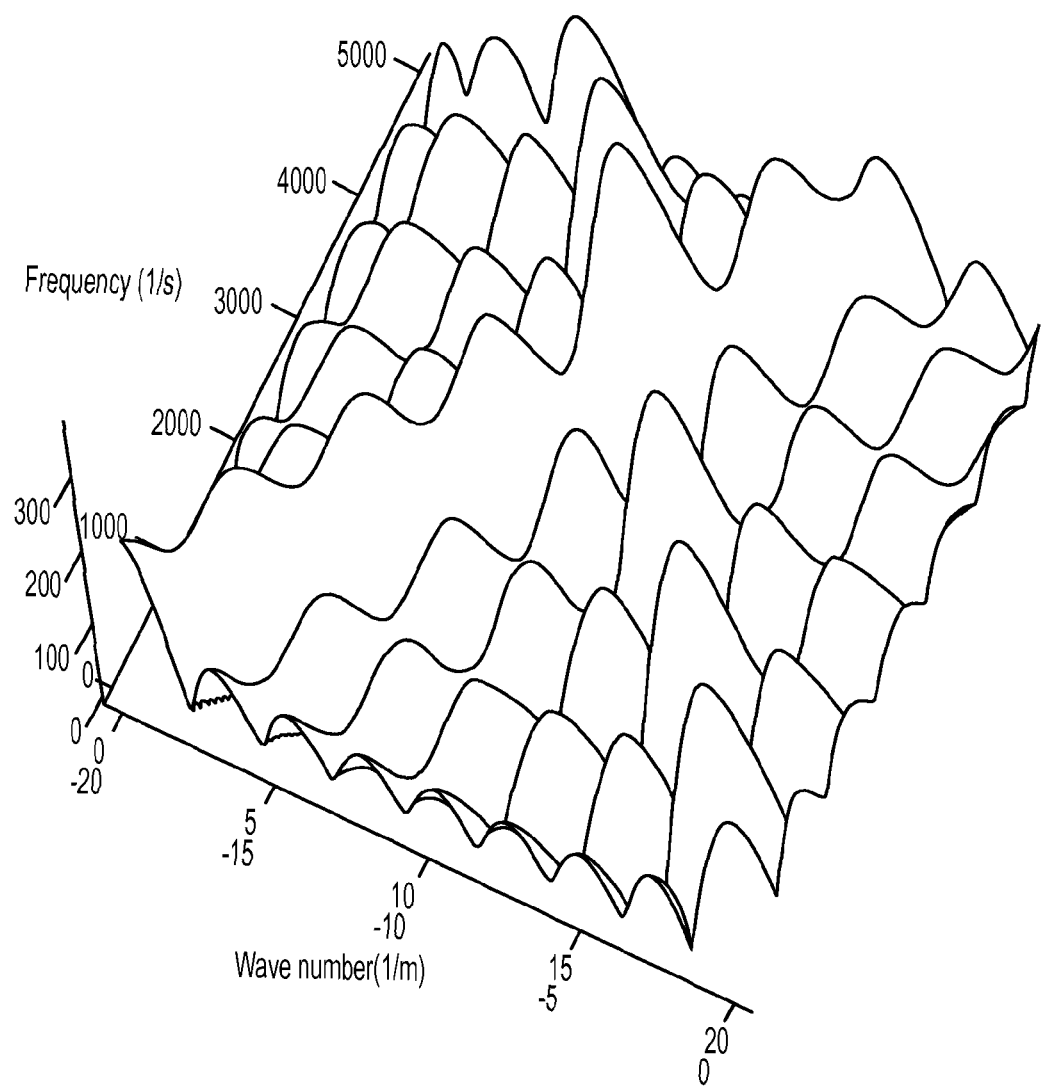
Figure 15:
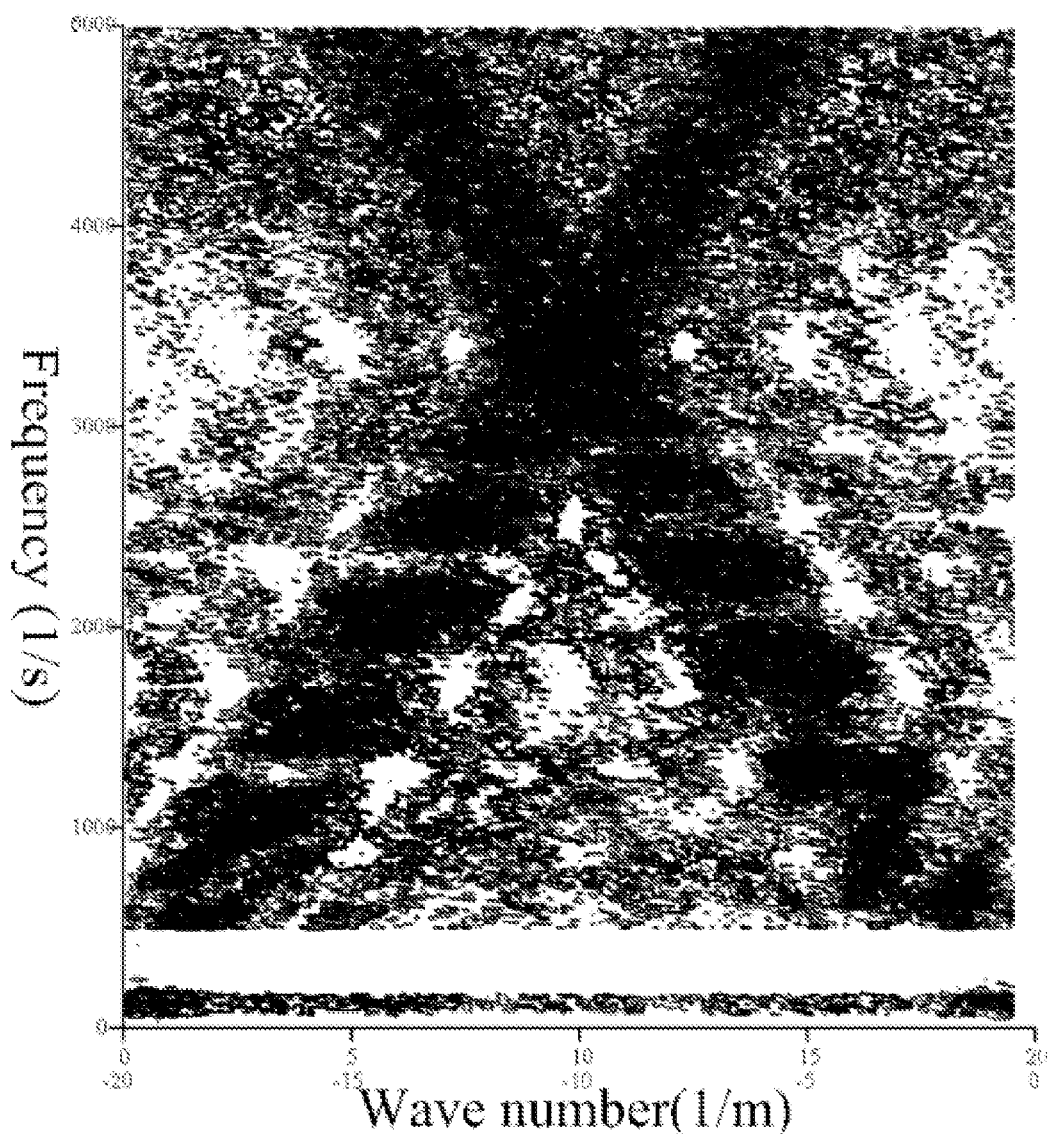

FIGS. 13-15 depict the experimental application of the methods described herein to model the propagation of sound waves propagating in both directions (left-to-right and right-to-left). FIG. 13 depicts a two-dimensional fast Fourier transform of the sound waves. FIG. 14 depicts a theoretical surface plot for the sound wave. FIG. 15 depicts a contour plot of FIG. 13.

Figure 16:
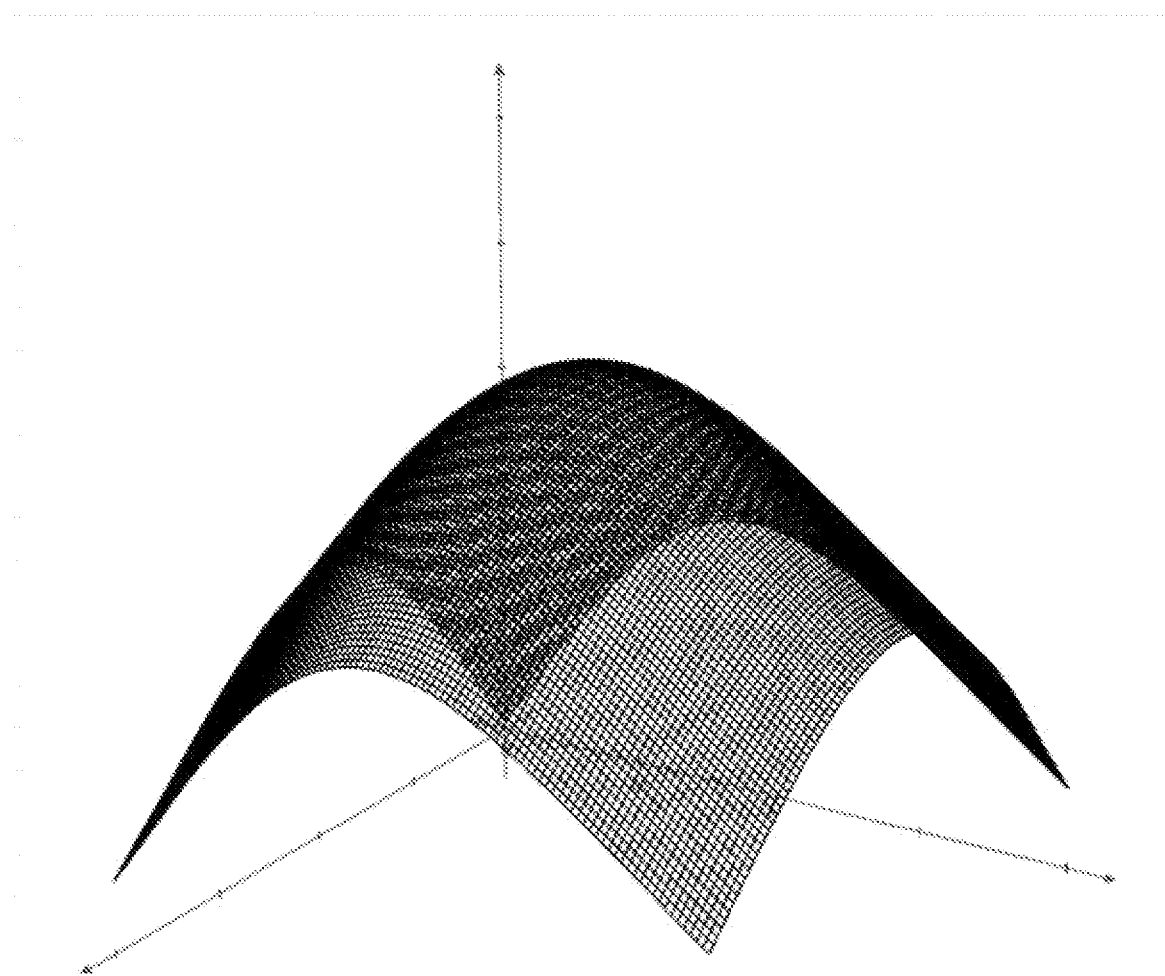
Figure 17:
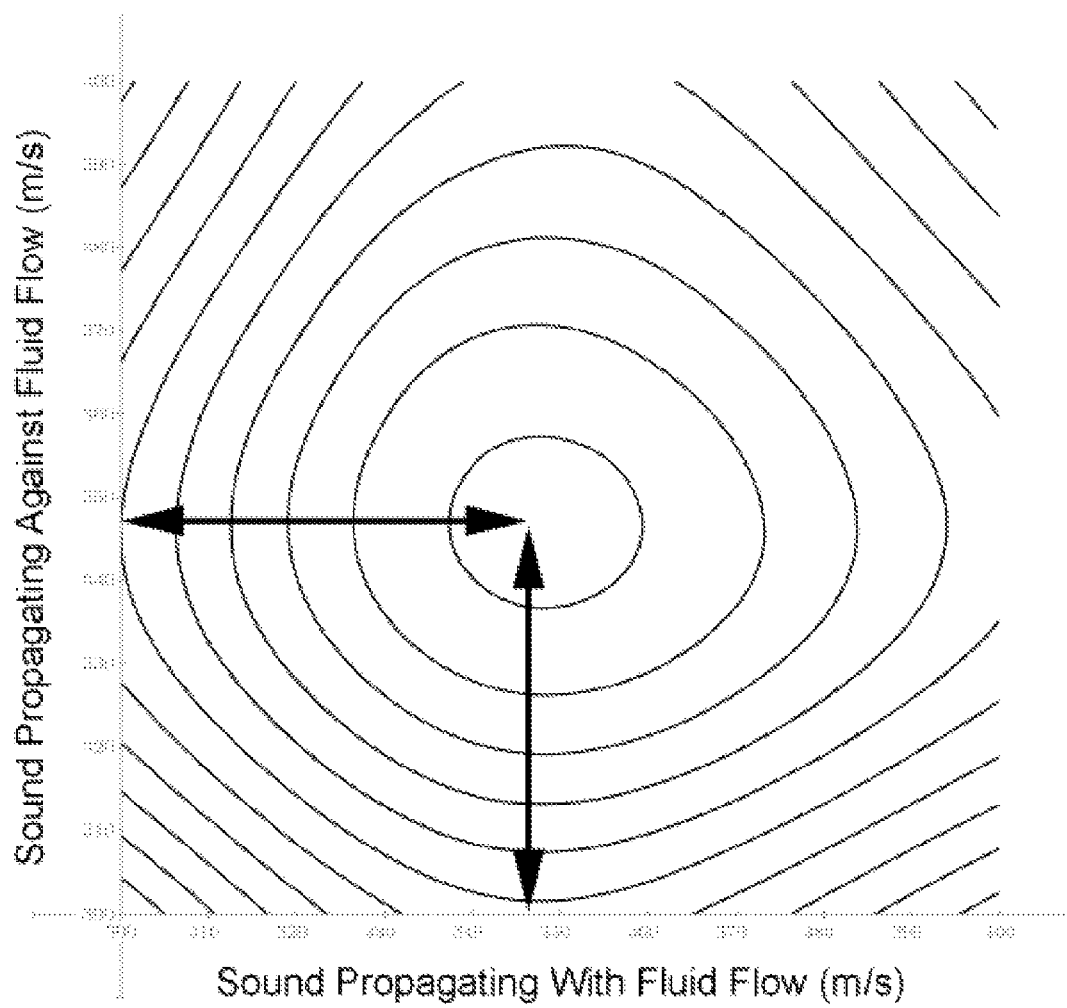

FIGS. 16-17 depict the correlation information corresponding to the two-dimensional fast Fourier transform data of FIG. 13, using the methods as described herein. FIG. 16 is a surface plot, while FIG. 17 is a contour plot.

Figure 18:
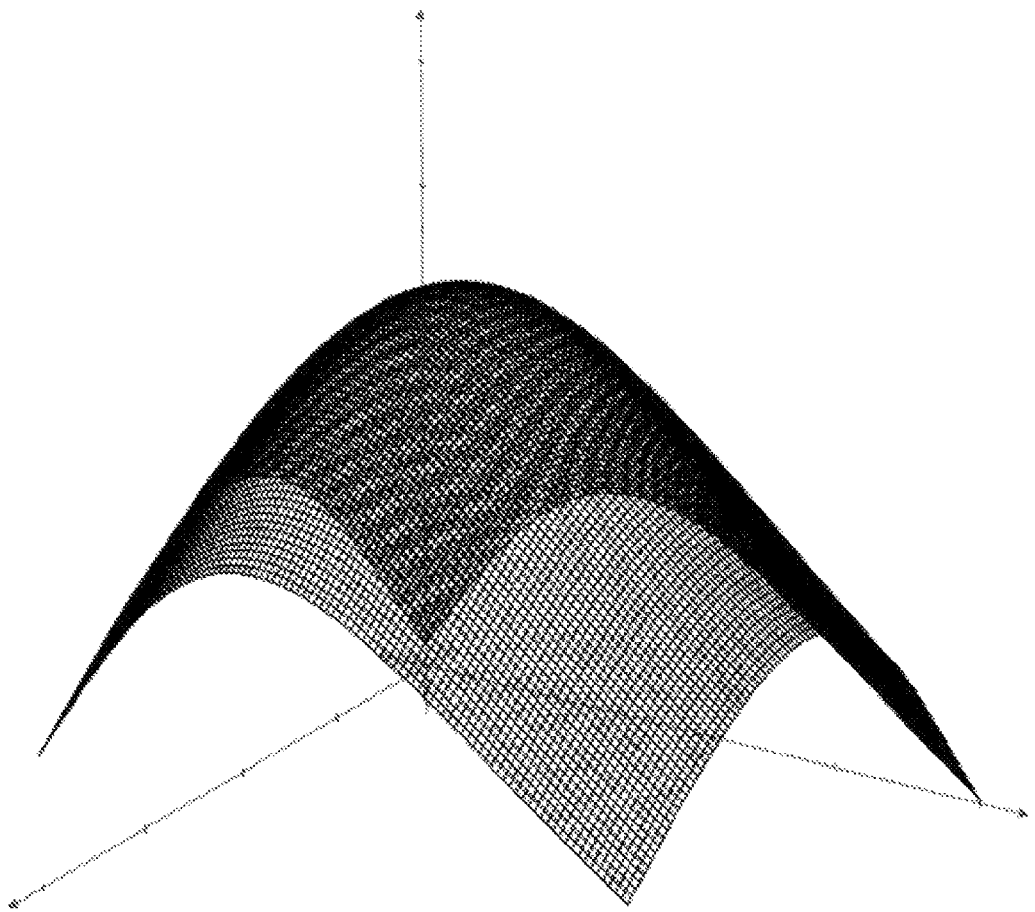
Figure 19:
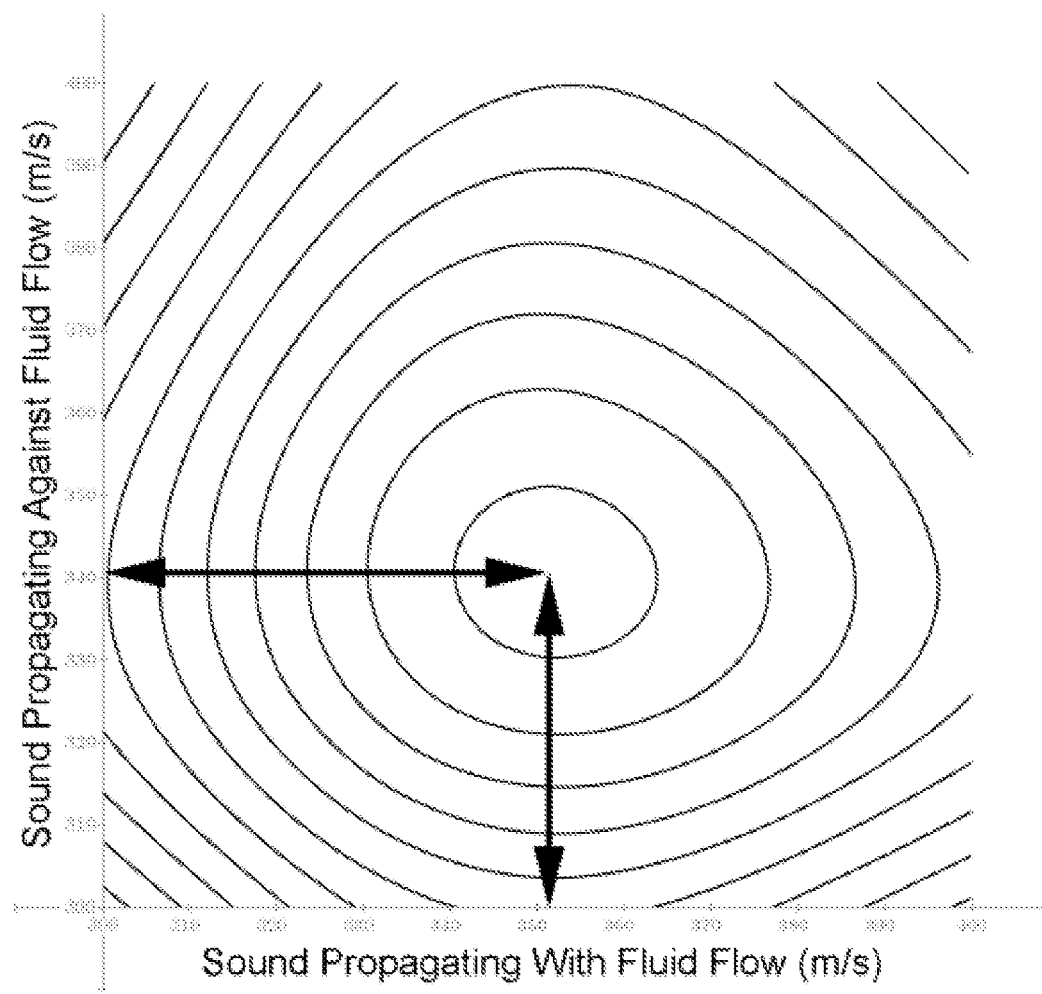

FIGS. 18-19 depict the correlation information associated with a fluid having a velocity flow of 5.5 m/s and a speed of sound of 347 m/s, using the methods as described herein. FIG. 18 is a surface plot, while FIG. 19 is a contour plot.

Figure 20:
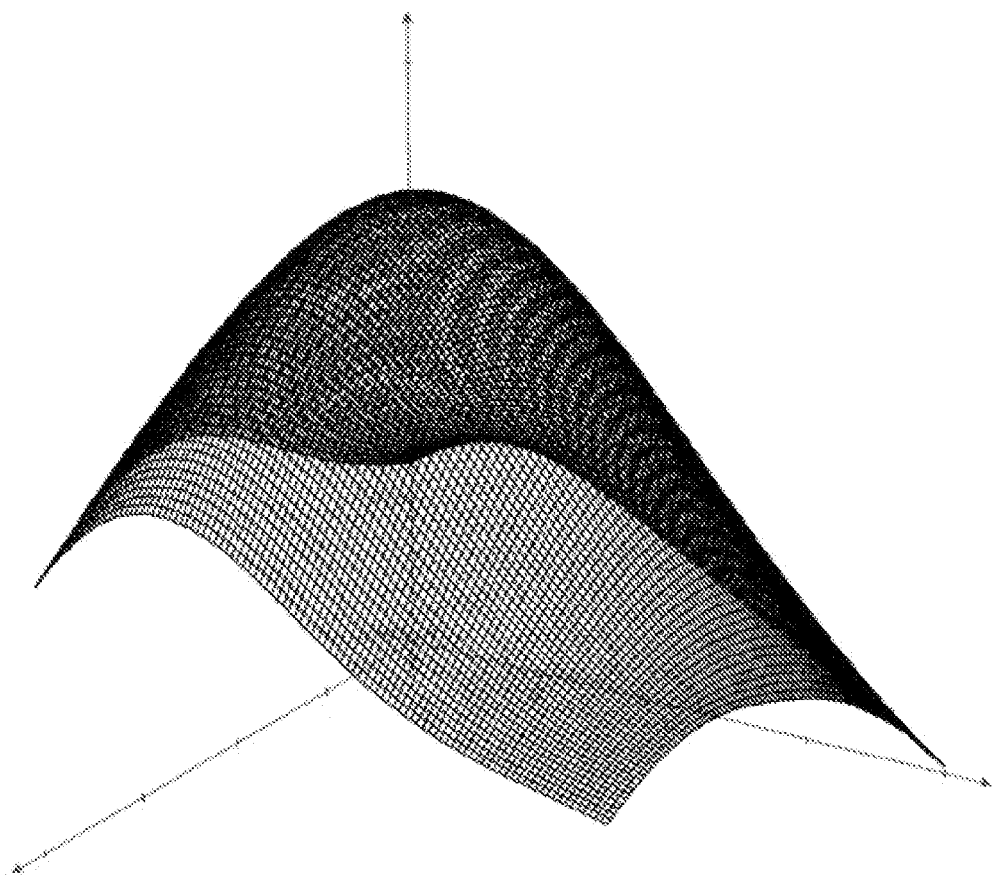
Figure 21:
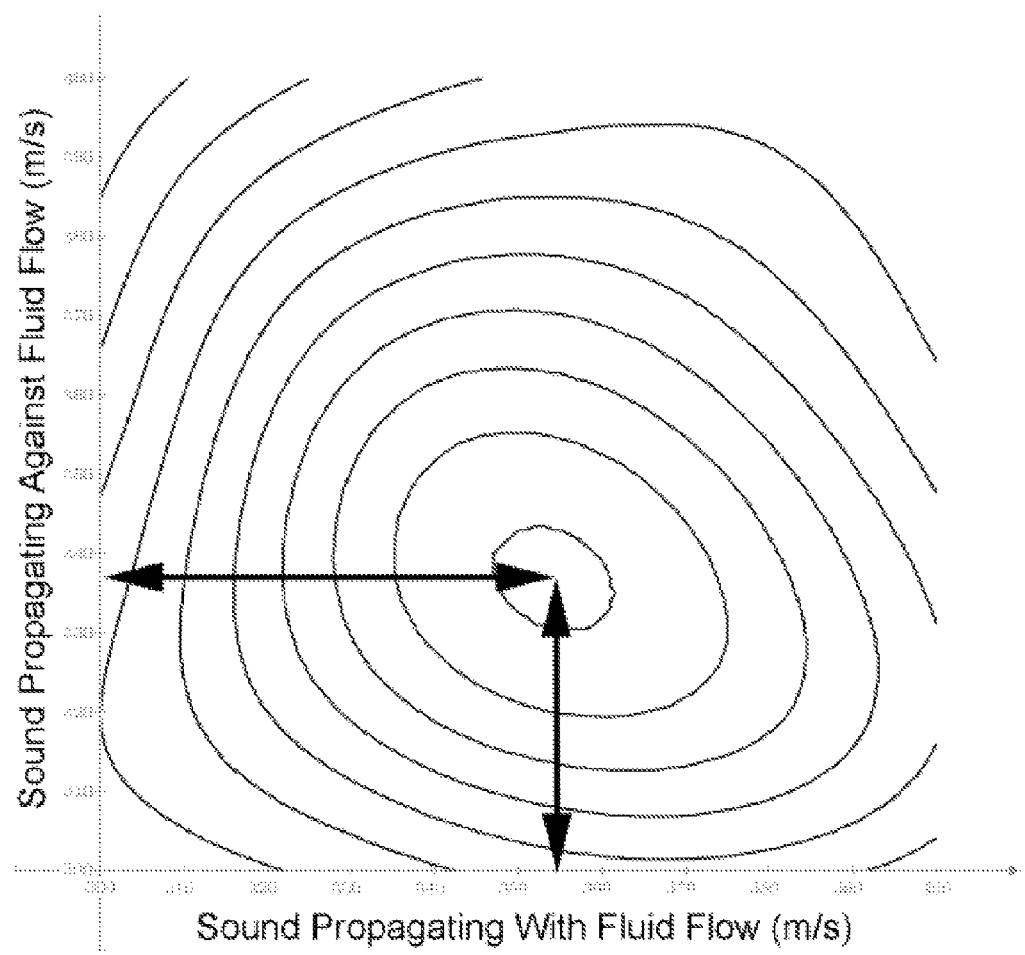

FIGS. 20-21 depict the correlation information associated with a fluid having a velocity flow of 9.0 m/s and a speed of sound of 347 m/s, using the methods as described herein. FIG. 20 is a surface plot, while FIG. 21 is a contour plot.

DETAILED DESCRIPTION OF THE INVENTION

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a transducer" can include two or more such transducers unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

As used herein, the term "fluid" can refer to a gas, a liquid, and mixtures thereof.

Figure 1:
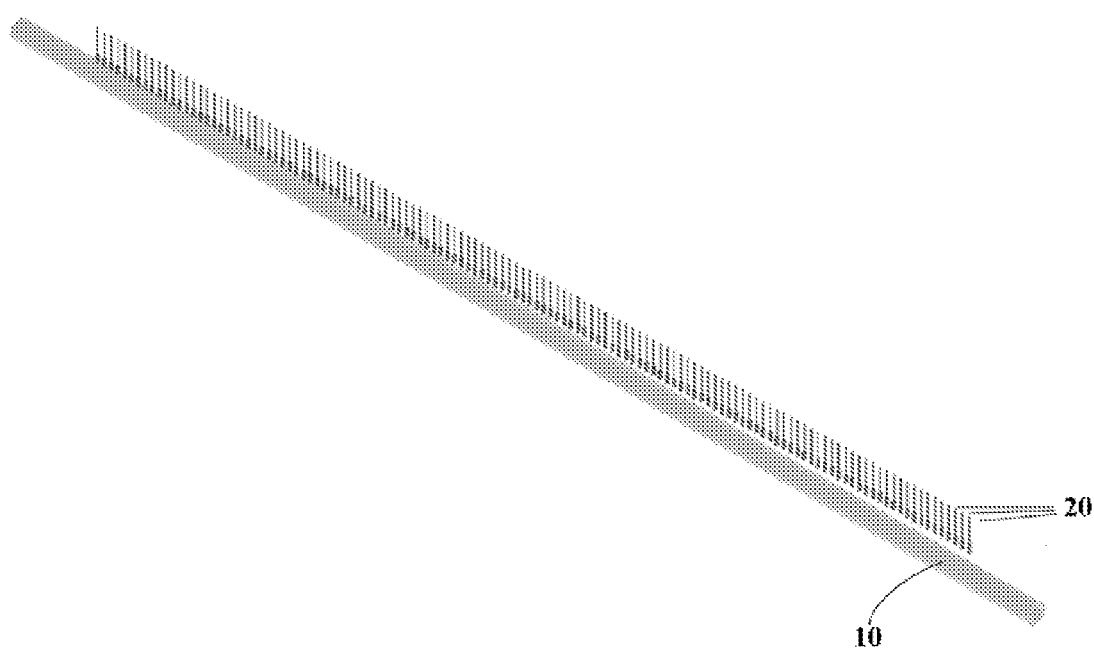
FIG. 1 is a perspective view of the plurality of transducers positioned along the external surface of the conduit, as described herein.
Figure 2:
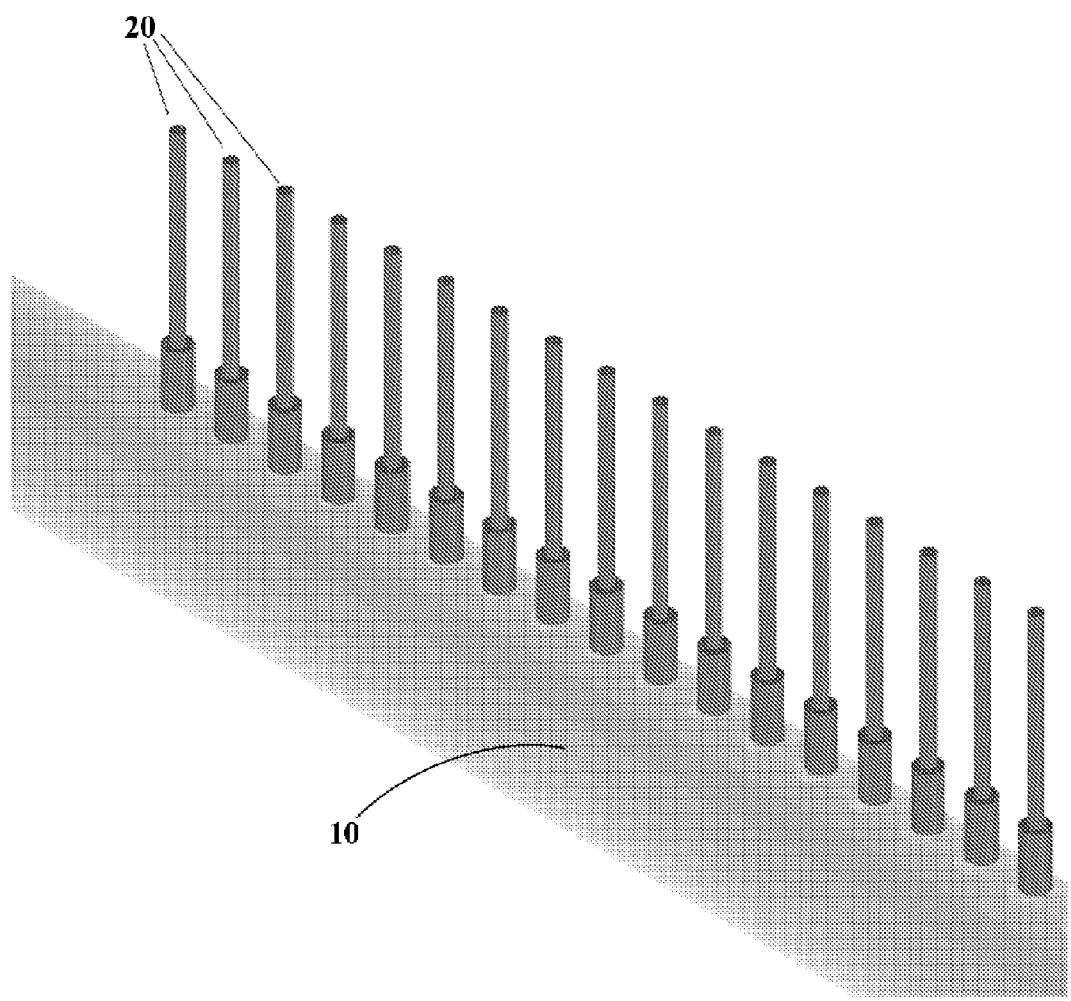
FIG. 2 is an enlarged perspective view of the plurality of transducers positioned along the external surface of the conduit, as described herein.
Figure 3:
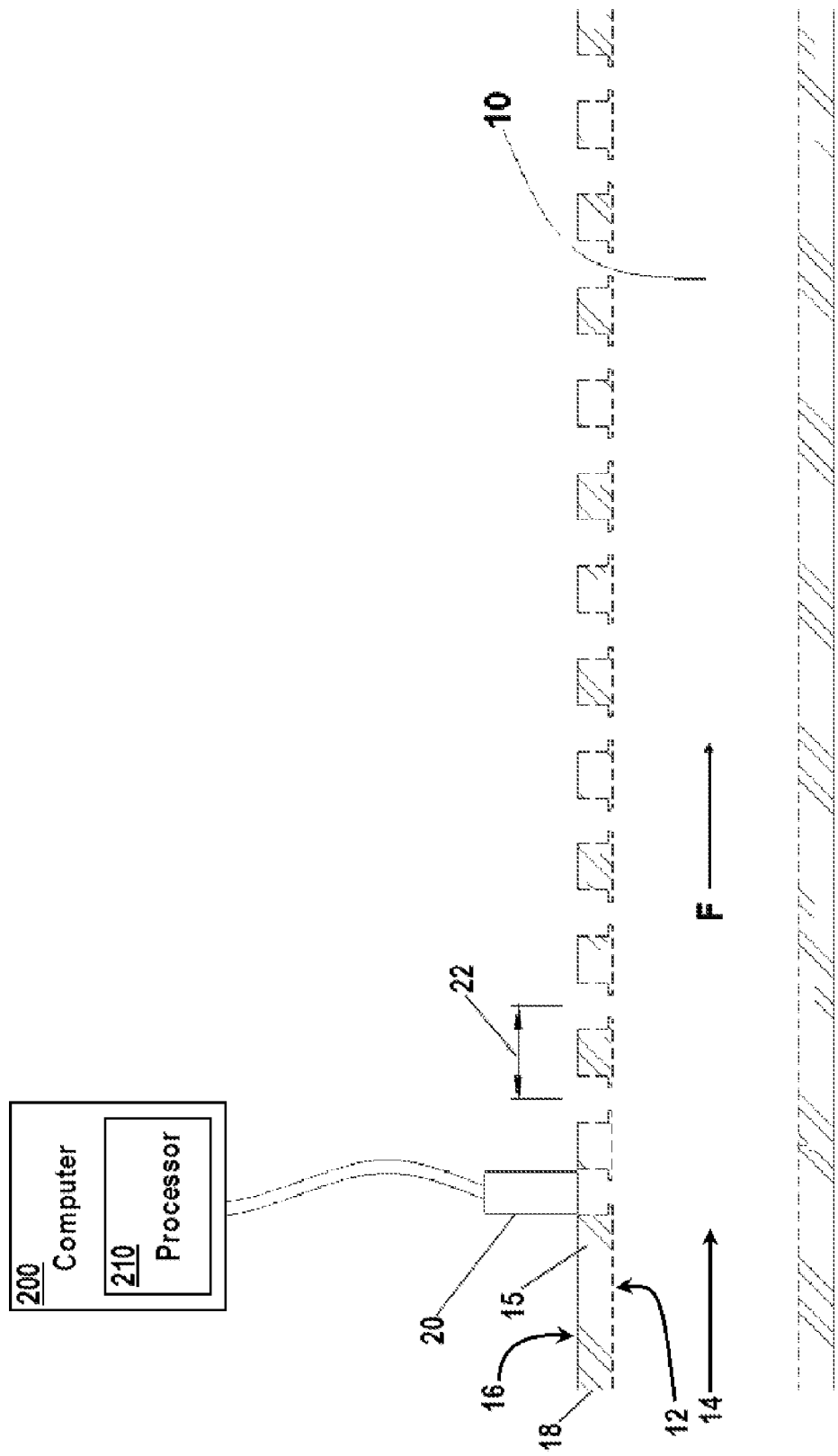
FIG. 3 is a cross-sectional side view of the conduit depicting the separation between respective transducers of the plurality of transducers.
Figure 4:
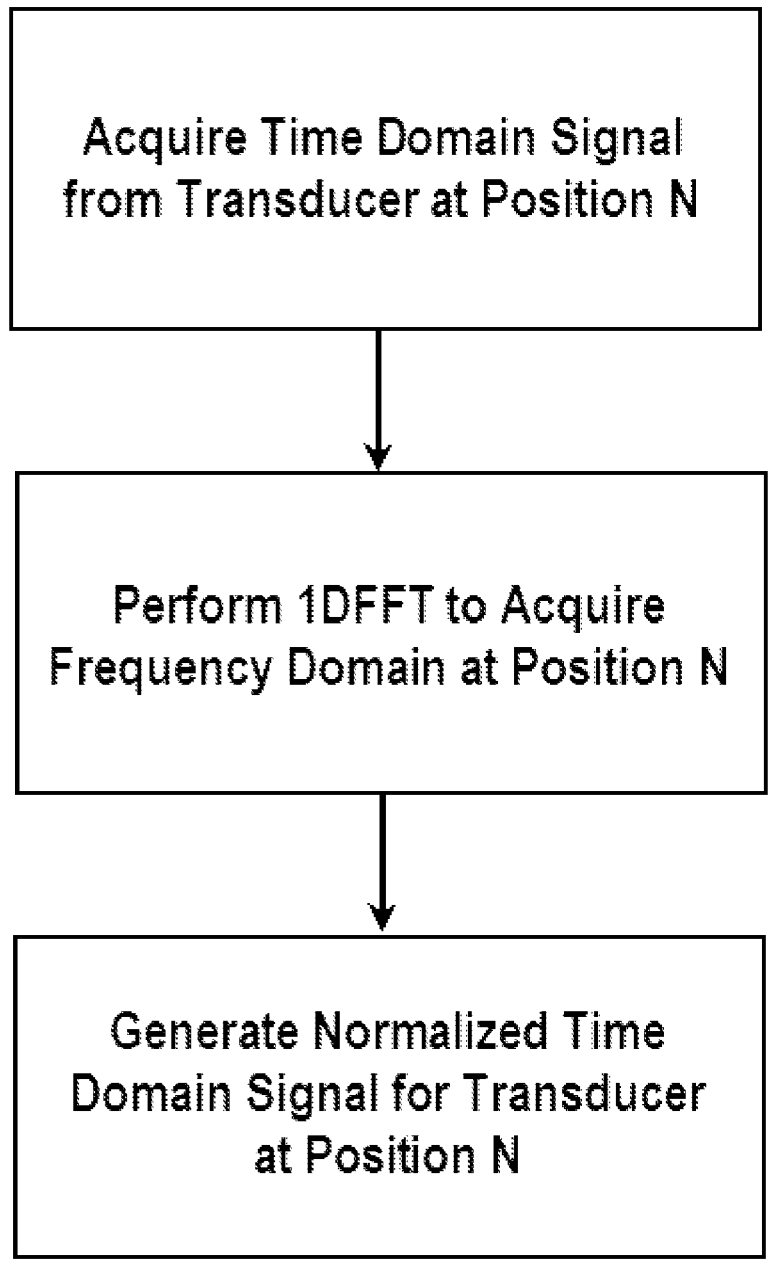
FIG. 4 depicts an exemplary method of determining the normalized time domain signal at a respective transducer of the plurality of transducers as described herein.
Figure 5:
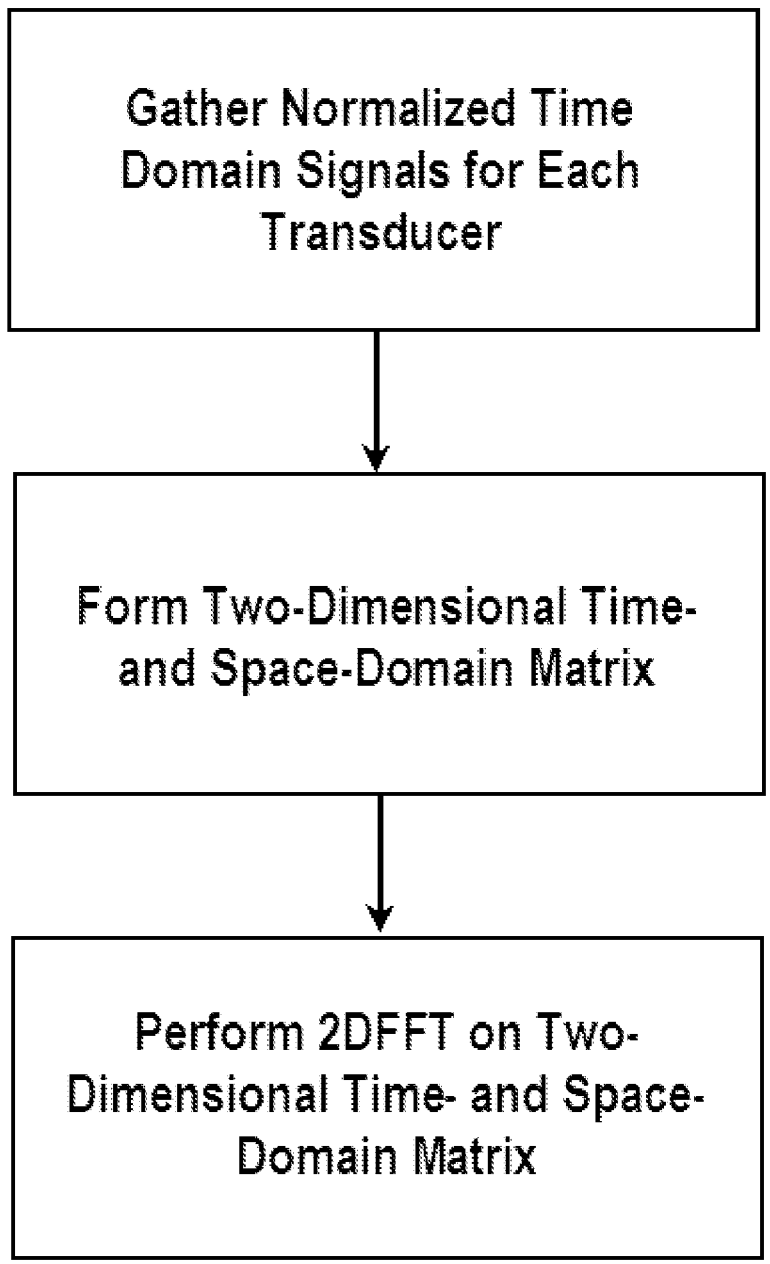
FIG. 5 depicts an exemplary method of forming a two-dimensional time and space domain matrix of data acquired by the plurality of sensors and applying a two-dimensional fast Fourier transform to the two-dimensional time and space domain matrix.

In one embodiment, and with reference to FIGS. 1-3, a system 100 for measuring the propagation of at least one sound wave within a conduit 10 containing a fluid is described. In exemplary aspects, the at least one sound wave can comprise a plurality of sound waves, and the system 100 can be configured to measure the superposition of a plurality of sound waves propagating within the conduit 10. In this embodiment, and as depicted in FIG. 3, the conduit 10 can have an inner surface 12 and an outer surface 16. It is contemplated that the inner surface 12 of the conduit 10 can define a bore 14 that is configured to receive the fluid. It is further contemplated that the fluid can flow through the bore 14 of the conduit 10 in a flow direction F. In one aspect, the plurality of sound waves can comprise two sound waves (a first sound wave and a second sound wave).

In one aspect, the system 100 for measuring the propagation of at least one sound wave can comprise a means for generating the at least one sound wave. In this aspect, the means for generating the at least one sound wave can comprise any means commonly known in the art for producing a sound wave within a fluid. For example and without limitation, it is contemplated that the means for generating the at least one sound wave can comprise at least one speaker or other vibratory device. However, as one having ordinary skill in the art will appreciate, it is contemplated that the at least one sound wave can be generated by the fluid flowing through the conduit. It is further contemplated that the at least one sound wave can include sound waves resulting from random or ambient sound.

In another aspect, the system 100 for measuring the propagation of the at least one sound wave can comprise a plurality of transducers 20 coupled to the conduit 10 such that the plurality of transducers are substantially parallel to the flow direction F along at least a portion of the outer surface 12 of the conduit 10. In exemplary aspects, the plurality of transducers 20 can be securely coupled to the outer surface 12 of the conduit 10. However, as shown in FIG. 3, in other exemplary aspects, it is contemplated that the plurality of transducers 20 can be secured within a wall 15 of the conduit 10 such that the plurality of transducers are positioned in fluid communication with the bore 14 of the conduit. In still other exemplary aspects, it is contemplated that the plurality of transducers 20 can be securely coupled to the inner surface 12 of the conduit 10 such that the plurality of transducers are in fluid communication with the bore 14 of the conduit. It is contemplated that the portion of the conduit 10 along which the plurality of transducers 20 are positioned can have any suitable longitudinal length for a particular application.

In exemplary aspects, each transducer 20 of the plurality of transducers can be configured to acquire data indicative of a sound wave within a normal acoustic region (ranging from about 0 to about 20 kHz). In these aspects, each transducer 20 of the plurality of transducers can comprise means for sensing the velocity of fluid flow through the conduit 10 in the flow direction F. In exemplary aspects, it is contemplated that the means for sensing the velocity of fluid flow through the conduit 10 can comprise a conventional flow sensor.

Additionally, each transducer 20 of the plurality of transducers can further comprise means for sensing the speed at which the at least one sound wave is propagating through the fluid. In exemplary aspects, it is contemplated that each transducer 20 can comprise a microphone for detecting sound within the conduit 10 proximate the transducer. In other exemplary aspects, it is contemplated that each transducer 20 can comprise an optoacoustic device configured to detect sound within the conduit proximate the transducer. In additional exemplary aspects, it is contemplated that the plurality of transducers 20 can be configured to detect one or more sound waves within the conduit through the wall 15 of the conduit.

In a further aspect, the each transducer 20 of the plurality of transducers can be spaced from an adjacent transducer relative to the flow direction F. In this aspect, each transducer 20 of the plurality of transducers can be positioned in a spaced position relative to a predetermined reference point 18 on the external surface 16 of the conduit 10. In this aspect, the spaced position can correspond to the longitudinal distance between the transducer 20 and the reference point 18.

It is contemplated that each transducer 20 of the plurality of transducers can be configured to detect sound waves propagating within the conduit 10 in a linear fashion relative to the flow of the fluid through the conduit. It is further contemplated that each transducer 20 of the plurality of transducers can be configured to also detect sound waves other than the sound waves propagating within the conduit 10, including, for example and without limitation, ambient sound waves.

As discussed herein, it is further contemplated that the system 100 can be used to analyze the at least one sound wave to identify the sound waves that are required for measurement of the flow velocity and the speed of sound within the conduit 10. In one aspect, the plurality of transducers 20 can comprise, for example and without limitation, electret transducers, piezoelectric transducers, fiber optic transducers, laser transducers, liquid transducers, Micro-Electrical Mechanical System (MEMS) transducers, and the like. However, it is contemplated that any transducer that is capable of detecting a sound wave and converting the sound wave into an electrical signal can be used in the system 100 described herein.

In an additional aspect, the system 100 for measuring the propagation of the at least one sound wave can comprise means for modeling the superposition of a plurality of sound waves as they propagate within the conduit 10. In this aspect, the means for modeling the superposition can be in communication with each transducer 20 of the plurality of transducers. Although described herein with respect to modeling the superposition of a plurality of sound waves, it is contemplated that the means for modeling the superposition can also be used to model the flow of a single sound wave within the conduit 10.

In a further aspect, the means for modeling the superposition of the plurality of sound waves can be configured to receive a data set in the form of a time domain signal from each transducer 20 indicative of the sensed velocity of fluid flow through the conduit 10 in the flow direction F and the sensed speed at which the sound waves are propagating through the fluid. As used herein, the term "time-domain signal" refers to the signal acquired by a transducer 20 over time that is indicative of the sound waves propagating through the conduit. As one will appreciate, the time-domain signal is distinguishable from a space-domain signal. For example, a sine wave can propagate in time according to the equation $\sin(2\pi ft)$ (time domain) or in position according to the equation $\sin(2\pi kx)$.

In an additional aspect, the means for modeling the superposition of the plurality of sound waves can be configured to assign a position value to the data set indicative of the spaced position of the transducer 20 which generated the data set. In still another aspect, the means for modeling the superposition of the plurality of sound waves can be configured to store an array of data sets and their corresponding position values. It is contemplated that the array of data sets can be used to determine the speed of the plurality of sound waves and the velocity of the fluid at a given position (corresponding to the location of a particular transducer). It is further contemplated that, upon storage of a selected number of data sets, the means for modeling the superposition can be configured to process the array of data sets to produce a model of the superposition of the plurality of sound waves as they propagate within the conduit 10.

In one aspect, it is contemplated that each sound wave of the plurality of sound waves can be generated at any position within the conduit 10 without affecting the functionality of the system 100 described herein. It is further contemplated that the phase, frequency, and amplitude of each sound wave of the plurality of sound waves does not affect the functionality of the system 100 described herein.

It is understood that a wave propagating through a conduit is bound by the conduit. Thus, as disclosed herein, in order to accurately model such a wave, it is necessary to apply accurate boundary conditions. Because the interference of ambient sound cannot be removed, conventional practice has required separation of the two different phase components of a waveform propagating through a conduit. However, as explained in further detail below, the methods and models disclosed herein do not require separation of left-to-right and right-to-left propagating waves.

The disclosed methods and models are based in part upon the assumption that sound waves propagating through the conduit 10 are propagating inwardly and outwardly, unbounded in three dimensions according to the following equation:

$$\nabla^2 \Psi = \frac{1}{c^2} \frac{\partial^2 \Psi}{\partial t^2},$$

where $\nabla^2 \Psi$ represents the laplacian of the wave equation $\Psi$, $$\frac{\partial^2 \Psi}{\partial t^2}$$

represents the second derivative of the wave equation with respect to time, and c represents the speed of the propagating wave.

Given that the wave is confined to a cylindrical conduit, the equation can be represented in cylindrical coordinates. Since left-to-right and right-to-left flow can only be separated in the z-axis (parallel to the flow direction F), the following equation is used to represent the other two coordinates (r and $\phi$):

$$\frac{1}{r}\left(\frac{\partial}{\partial r} r \frac{\partial}{\partial r} \Psi\right) + \frac{1}{r^2}\frac{\partial^2 \Psi}{\partial \phi^2} + \frac{\partial^2 \Psi}{\partial z^2} = \frac{1}{c^2}\frac{\partial^2 \Psi}{\partial t^2}.$$

The above equation can be separated as follows:

$$r\left(\frac{\partial}{\partial r}r\frac{\partial}{\partial r}\Psi\right)+r^2\left(\frac{\partial^2\Psi}{\partial z^2}-\frac{1}{c^2}\frac{\partial^2\Psi}{\partial t^2}\right)=-\frac{\partial^2\Psi}{\partial\phi^2}.$$

If a separable solution is assumed where R(r) represents the bound radial component of the wave, $\Phi(\phi)$ represents the angular rotation of the wave in the cylindrical conduit, and P(z,t) represents the unbounded propagating wave, then the following equation can be used:

$$\Psi(r,z,t)=R(r)\Phi(\phi)P(z,t).$$

The wave equation can now be reduced to the following:

$$\frac{r}{R(r)}\left(\frac{\partial}{\partial r}r\frac{\partial}{\partial r}R(r)\right)+\frac{r^2}{P(z,t)}\left(\frac{\partial^2 P(z,t)}{\partial z^2}-\frac{1}{c^2}\frac{\partial^2 P(z,t)}{\partial t^2}\right)=$$

$$-\frac{1}{\Phi(\phi)}\frac{\partial^2\Phi(\phi)}{\partial\phi^2}=m^2,$$

where m represents an arbitrary constant employed in the separation of variable $\phi$.

The solution for the angular rotation wave can be found based on the following equation:

$$\Phi(\phi)=e^{im\phi}.$$

The boundary conditions mandate a continuous wave, hence m=0, ±1, ±2, etc. As further described below, it can be assumed for real data that m=0 because the wave propagates with substantially no rotational component. Thus, the wave equation can be reduced to the following:

$$\frac{r}{R(r)}\left(\frac{\partial}{\partial r}r\frac{\partial}{\partial r}R(r)\right)+\frac{r^2}{P(z,t)}\left(\frac{\partial^2 P(z,t)}{\partial z^2}-\frac{1}{c^2}\frac{\partial^2 P(z,t)}{\partial t^2}\right)=m^2.$$

A new constant A having the following form can be reduced:

$$\frac{1}{P(z,t)}\left(\frac{\partial^2 P(z,t)}{\partial z^2}-\frac{1}{c^2}\frac{\partial^2 P(z,t)}{\partial t^2}\right)=A^2.$$

This can be rearranged to further separate the variable as follows:

$$\frac{r}{R(r)}\left(\frac{\partial}{\partial r}r\frac{\partial}{\partial r}R(r)\right)+r^2A^2=m^2.$$

If it is assumed the propagating wave has no angular component, and m=0, then the equation can be rearranged in the form of a cylindrical Bessel function:

$$r^2\frac{\partial^2 R}{\partial r^2}+r\frac{\partial R}{\partial r}+(A^2r^2-m^2)R=0.$$

This equation has the solution of the zeroth order (since m=0) cylindrical Bessel function of the first kind ($J_0$):

$$R(r)=J_0(Ar).$$

The unbound portion of the wave that can propagate from left-to-right and right-to-left can be addressed with the remaining portion of the wave equation:

$$\frac{1}{P(z,t)}\left(\frac{1}{c^2}\frac{\partial^2 P(z,t)}{\partial t^2}-\frac{\partial^2 P(z,t)}{\partial z^2}\right)=-A^2.$$

As previously indicated, the wave equation was developed with the assumption that waves are propagating from left-to-right and right-to-left at the same time (in and out in three dimensions). However, it is possible to separate the equation into a left-to-right form and a right-to-left form to address both wave components. The fundamental form of the equation before combining the Left to Right and Right to Left components can be represented as follows:

$$\frac{1}{P(z,t)}\left(\frac{1}{c}\frac{\partial}{\partial t}-\frac{\partial}{\partial z}\right)\left(\frac{1}{c}\frac{\partial}{\partial t}+\frac{\partial}{\partial z}\right)P(z,t)=-A^2.$$

Thus, the partial differential operator can be separated into two terms, a Left-to-Right term $$\left(\frac{1}{c}\frac{\partial}{\partial t}+\frac{\partial}{\partial z}\right)$$

and a Right-to-Left term $$\left(\frac{1}{c}\frac{\partial}{\partial t}-\frac{\partial}{\partial z}\right).$$

A parallel solution for both the Right to Left and Left to Right propagating waves can then be developed. A Right-to-Left propagating wave can be represented by the following equation:

$$\frac{1}{P_{RL}(z,t)}\left(\frac{1}{c}\frac{\partial}{\partial t}-\frac{\partial}{\partial z}\right)^2 P_{RL}(z,t)=-A^2.$$

Thus, for a wave propagating from Right to Left, there is a solution of $$P_{RL}(z,t)=e^{2\pi i(ft+kx)},$$

where k represents the wave number (or 1/wavelength).

If the Right to Left partial differential equations are expanded and the Right to Left solution is substituted, then the following equation results:

$$\frac{1}{e^{2\pi i(ft+kz)}}\left(\frac{1}{c^2}\frac{\partial^2}{\partial t^2}-\frac{2}{c}\frac{\partial^2}{\partial z\partial t}+\frac{\partial^2}{\partial z^2}\right)e^{2\pi i(ft+kz)}=-A^2.$$

Following operation of the partial differential operators, the following equation results:

$$\frac{1}{e^{2\pi i(ft+kz)}}\left(\frac{1}{c^2}(-(2\pi f)^2)-\frac{2}{c}(-(2\pi)^2 fk)+(-(2\pi k)^2)\right)e^{2\pi i(ft+kz)}=-A^2.$$

This equation can be reduced to the following:

$$-(2\pi)^2\left(\frac{f^2}{c^2} - \frac{2}{c}(fk) + k^2\right) = -A^2.$$

Further reduction reveals a solution for A:

$$(2\pi)^2\left(\frac{f}{c} - k\right)^2 = A^2,$$

where $$A = 2\pi\left(\frac{f}{c} - k\right)$$

or $$2\pi\left(k - \frac{f}{c}\right).$$

It is contemplated that, because the Bessel function is an even function, the form of the equation does not make a difference on the result. For example, as shown below, the solution for A for the Right-to-Left partial differential operator can be the same as the solution for A for the Left-to-Right partial differential operator.

$$\frac{1}{P_{LR}(z,t)}\left(\frac{1}{c}\frac{\partial}{\partial t} + \frac{\partial}{\partial z}\right)^2 P_{LR}(z,t) = -A^2$$

$$\frac{1}{e^{2\pi i(ft-kz)}}\left(\frac{1}{c^2}\frac{\partial^2}{\partial t^2} + \frac{2}{c}\frac{\partial^2}{\partial z \partial t} + \frac{\partial^2}{\partial z^2}\right)e^{2\pi i(ft-kz)} = -A^2$$

Substituting the individual solutions into the combined wave equation reveals that the solution for a bound wave propagating from Left to Right is as follows:

$$\Psi_{LR}(r, z, t) = NJ_0\left(2\pi r\left(\frac{f}{c} - k\right)\right)e^{2\pi i(ft-kz)},$$

where N is an amplitude component.

Analogously, the form of the solution for a bound wave propagating from Right to Left can be represented as follows:

$$\Psi_{RL}(r, z, t) = NJ_0\left(2\pi r\left(\frac{f}{c} - k\right)\right)e^{2\pi i(ft+kz)}$$

Experimental testing has confirmed that this wave equation substantially exactly models the time and space domain of a sound wave capture in a conduit by a two-dimensional acoustic array, such as the plurality of transducers described herein. A calibration term $M_{cal}$ can be added to better fit the real data:

$$\Psi_{RL}(r, z, t) = NJ_0\left(M_{cal}2\pi r\left(\frac{f}{c} - k\right)\right)e^{2\pi i(ft+kz)}$$

$$\Psi_{LR}(r, z, t) = NJ_0\left(M_{cal}2\pi r\left(\frac{f}{c} - k\right)\right)e^{2\pi i(ft-kz)}.$$

The boundary condition at the wall of the conduit can then be addressed. Given that the velocity of the wave can be defined as $\vec{v} = \vec{\nabla}\Psi$, and that the radial velocity at the wall must be zero, the following boundary condition can be used:

$$v_r = \frac{\partial \Psi}{\partial r} = \frac{\partial J_0(Ar)}{\partial r} = 0$$

Roots of the first derivative of this zeroth order Bessel function can be found numerically. The first six roots ($\zeta_i$) are in Table 1, which follows.

TABLE 1

| i | Roots ($\zeta_i$) |
|---|---|
| 0 | 0 |
| 1 | 3.831630 |
| 2 | 7.015578 |
| 3 | 10.173635 |
| 4 | 13.323847 |
| 6 | 16.470579 |

The preceding description demonstrates that there is more than one diagonal result from the two-dimensional fast Fourier transform (2DFFT). This is contrary to the teachings of known systems, such as the system taught in U.S. Pat. No. 7,725,270, which teaches that there is only a single diagonal spectra in the 2DFFT that is related to $$\left(\frac{f}{c} - k\right) = 0.$$

Indeed, there are multiple diagonal spectra possibilities that can be determined according to the following formulas:

$$M_{cal}2\pi r_w\left(\frac{f}{c} - k\right) = \pm \zeta_i$$

or $$\left(\frac{f}{c} - k\right) = \frac{\pm \zeta_i}{M_{cal}2\pi r_w}$$

Given $r_w$ is the fixed radius of the cylindrical conduit, the following equations can be used to model the propagation of sound in a cylindrical conduit:

$$\Psi_{RL}(r, z, t) = NJ_0\left(M_{cal}2\pi r_w\left(\frac{f}{c} - k\right)\right)e^{2\pi i(ft+kz)},$$

$$\Psi_{LR}(r, z, t) = NJ_0\left(M_{cal}2\pi r_w\left(\frac{f}{c} - k\right)\right)e^{2\pi i(ft-kz)}.$$

In one aspect, the plurality of sound waves can comprise a first sound wave and a second sound wave. In this aspect, the first sound wave can propagate in the direction of flow, and the second sound wave can propagate opposite the direction of flow. It is contemplated that the first sound wave and the second sound wave can be modeled using the above wave equation, which is generally referred to herein as the "conduit bound propagation separation model (CBPSM)" equation.

In exemplary aspects, the means for modeling the superposition of the plurality of sound waves can comprise a computer having a processor. In this aspect, the processor can comprise an analog-to-digital converter for processing the data sets received from the plurality of transducers 20. As shown in FIG. 3, it is contemplated that the processor of the computer can be in operative communication with each transducer 20 of the plurality of transducers such that the processor (and analog-to-digital converter) is configured to receive the data sets collected by each respective transducer. The processor can be in operative communication with the plurality of transducers 20 through any conventional communication means, including wired and wireless electronic connections. In another aspect, the processor (and, optionally, the analog-to-digital converter) can process the data sets at a sample rate.

In one exemplary aspect, and not meant to be limiting, in order to adequately model the sound waves using the wave equation, the plurality of transducers 20 can comprise $2^N$ transducers, wherein N is greater or equal to 3, greater or equal to 4, and preferably is greater or equal to 5. However, it is contemplated that the system 100 can function as disclosed herein with as few as two transducers. In one aspect, the plurality of transducers 20 can comprise 32 transducers (N=5). In another aspect, the plurality of transducers 20 can comprise 64 transducers (N=6). In still another aspect, the plurality of transducers 20 can comprise 128 transducers (N=7). In a further aspect, the plurality of transducers 20 can comprise 256 transducers (N=8). It is contemplated that the accuracy of the special component of the model can be improved by increasing the number of transducers in the system. It is further contemplated that the accuracy of the time component of the model can be increased by acquiring additional data from the plurality of transducers 20.

In exemplary aspects, it is contemplated that the size and dimensions of the transducer array can be determined in view of several factors, including, for example and without limitation, the sample rate (SR) of the processor for the time domain, which determines the maximum frequency ($f_{max}$=SR/2) at which data sets can be acquired, the separation distance between adjacent transducers ($z_{min}$), and the propagation speed (c) of the at least one wave. It is contemplated that the maximum wavenumber ($k_{max}$=1/(2$z_{min}$)) can be the inverse of the distance between the adjacent transducers. It is further contemplated that the major diagonal in the 2d-FFT can fit perfectly across the entire domain with the speed of sound ($c_{SOS}$) of the fluid.

In an additional aspect, each transducer 20 of the plurality of transducers can be longitudinally spaced from adjacent transducers by a separation length ($z_{min}$). In this aspect, the separation length ($z_{min}$) of the transducers 20 can be related to the sample rate (SR) of the processor (analog-to-digital converter) and the speed ($c_{SOS}$) at which the plurality of sound waves are propagating through the fluid. The relationship between sample rate, separation length, and speed of the sound waves can be represented by the following equation:

$$c_{SOS} = \frac{f_{max}}{k_{max}} = \frac{SR}{2} z_{min}$$

Using these relationships, and with reference to FIG. 3, the components of the system 100 can be used to calculate an appropriate separation length 22 of the transducers 20. In one aspect, the separation length 22 can be between about 0.5 inches and 3.5 inches, more preferably between about 1.0 and 3.0 inches, and most preferably between about 1.5 and 2.5 inches. In exemplary aspects, the separation length 22 can be about 2 inches. However, it is contemplated that, the more transducers 20 there are in the system, the smaller the separation length 22 can be. It is further contemplated that, the shorter the portion of the external surface 16 of the conduit 10 along which the transducers 20 are positioned, the smaller the separation length 22 can be. Specifically, the separation length 22 can be selectively reduced to accommodate additional transducers 20 and to improve the accuracy of the model produced by the system 100. In another aspect, it is contemplated that the separation length 22 can be substantially inversely proportional to the sample rate. Therefore, in this aspect, the separation length 22 will be proportionally decreased as the sample rate increases. In particular, if the plurality of sound waves comprise a plurality of high-frequency sound waves, the sample rate can be increased, thereby leading to a decrease in separation length. Additionally, as the speed of sound associated with the fluid within the conduit 10 decreases, the separation length 22 can be proportionally decreased.

However, it is contemplated that the sample rate can be higher or lower depending on the performance of the components of the system 100, as well as the number of transducers 20. Additionally, it is further contemplated that the sample rate can be determined with reference to the maximum frequency of sound discernable within the conduit 10. In exemplary aspects, it is contemplated that the sample rate can be less than about 40,000 samples per second.

Optionally, in a further aspect, the plurality of transducers 20 can be detachably mountable on the outer surface 16 of the conduit 10. It is contemplated that the plurality of transducers 20 can be mounted on the outer surface 16 using any conventional means commonly known in the art, such as, for example and without limitation, suction means, temporary binders, clamping means, fixation means and the like. In this aspect, the plurality of transducers 20 can be interconnected to form a substantially linear array of transducers. It is contemplated that the substantially linear array of transducers 20 can permit movement of the plurality of transducers while maintaining the desired separation length 22 between adjacent transducers.

In use, a method of using the system described herein can comprise positioning the plurality of transducers 20 substantially parallel to the flow direction F as described herein. In exemplary aspects, the plurality of transducers 20 can be positioned along at least a portion of the outer surface 16 of the conduit 10. In an additional aspect, each transducer 20 of the plurality of transducers can be positioned in a spaced position relative to the predetermined reference point on the external surface of the conduit 10.

In another aspect, the method can comprise receiving at least one data set in the form of a time domain signal from each transducer 20 indicative of the sensed velocity of fluid flow through the conduit 10 in the flow direction F and the sensed speed at which the sound waves are propagating through the fluid. In an additional aspect, the method can comprise assigning a position value to each data set indicative of the spaced position of the transducer which generated the data set and time domain signal. In a further aspect, the method can comprise storing an array of data sets and their corresponding position values. In still a further aspect, the method can comprise processing the array of data sets to produce a model of the superposition of the plurality of sound waves as they propagate within the conduit 10.

It is contemplated that the flow of the at least one sound wave through the conduit can be independent of amplitude. Thus, it is contemplated that electronic/mechanical amplitude calibration does not need to be extremely precise. It is still further contemplated that as each time domain signal (and data set) is captured by a transducer, a numerical normalization of amplitude can occur such that any discrepancies between transducers are removed.

In another aspect, after the time domain signals (data sets) are collected from each respective transducer, the step of processing the array of data sets can comprise performing a one-dimensional fast Fourier transform (1DFFT) on each respective time domain signal to determine the real and imaginary coefficients for each frequency ($C^{real}$ and $C^{imag}$). In a further aspect, using the following equation, a normalized time domain signal can be produced for each transducer:

$$T_i^{norm} = \sum_j \frac{(C_j^{real}\cos(2\pi f_i T_i) + C_j^{imag}\sin(2\pi f_i T_i))}{\sqrt{(C_j^{real})^2 + (C_j^{imag})^2}},$$

where:
$T_i^{norm}$=the normalized time domain signal for the transducer at position (i)
$T_i$=the time domain signal measured at a given transducer at position (i) within the conduit,
$C_j^{real}$=the real frequency coefficient based on the time domain signal measured at a given transducer at position (j),
$C_j^{imag}$=the imaginary frequency coefficient based on the time domain signal measured at a given transducer at position (j), and
$f_j$=the frequency at a given transducer at position (j).

In an additional aspect, the step of processing the array of data sets (time domain signals) can comprise forming a two-dimensional time- and space-domain matrix based on the normalized time domain signals produced for each respective transducer and the horizontal position of each respective transducer. In still another aspect, the step of processing the array of data sets (time domain signals) can comprise performing a two-dimensional fast Fourier transform (2DFFT) on the two-dimensional time- and space-domain matrix.

In a further aspect, the step of processing the array of data sets can comprise modeling the superposition of the plurality of sound waves using the wave equations $$\Psi_{RL}(r, z, t) = NJ_0\left(M_{cal}2\pi r_w\left(\frac{f}{c} - k\right)\right)e^{2\pi i(ft+kz)},$$

and $$\Psi_{LR}(r, z, t) = NJ_0\left(M_{cal}2\pi r_w\left(\frac{f}{c} - k\right)\right)e^{2\pi i(ft-kz)},$$

where:
$\Psi$=the phase of the wave moving right-to-left (RL) or left-to-right (LR) through the conduit,
$r_w$=the radius of the conduit,
z=the horizontal position of the wave measured relative to the direction of fluid flow within the conduit,
t=elapsed time since generation of the wave,
N=amplitude of the sound wave,
$J_0$=cylindrical Bessel function of the first kind,
$M_{cal}$=calibration coefficient,
f=frequency of the sound waves,
c=speed of the sound waves within the conduit, and
k=the wavenumber associated with the sound waves.

In a further aspect, the step of processing the array of data sets can comprise sorting the 2DFFT data and the wave equation data to identify maximum correlation between the 2DFFT data and the wave equation data. In this aspect, the maximum correlation can be identified by preparing a three-dimensional correlation surface map and/or contour plot of the 2DFFT data and the wave equation data, with the speed of the sound waves in the left-to-right and right-to-left directions being provided on opposing axes. It is contemplated that the location of maximum correlation between the 2DFFT data and the wave equation data can correspond to the location at which the speed of the sound waves in the left-to-right direction is equal to the speed of the sound waves in the right-to-left direction. It is further contemplated that this location of maximum correlation can correspond to the measured speed of sound (c) within the conduit.

In exemplary aspects, a set of surfaces can be generated from the CBPSM equation for a left-to-right propagating speed ranging from 300 m/s to 400 m/s and, similarly, for right-to-left propagating speeds with a precision of about 1 m/s. This set of surfaces can represent about 10,000 (100× 100) surfaces.

It is contemplated that each surface of the surface map can be correlated with the data acquired from the plurality of transducers 20 by a least squares comparison test as is known in the art. A resulting correlation coefficient can then be plotted against the right-to-left and left-to-right speeds as shown in FIGS. 16, 18, and 20. The maximum correlation can represent the best fit of the data to the CBPSM equation. It is contemplated that the maximum correlation can reveal the propagating speeds both with and against the flow of the fluid within the conduit.

When there is a non-zero velocity of fluid within the conduit, then it is contemplated that the maximum correlation can be determined for both right-to-left flow and left-to-right flow, thereby providing the sound propagation ($c_W$) with the direction of fluid flow and the sound propagation ($c_A$) against the direction of fluid flow. Using this information, it is contemplated that the velocity of fluid flow within the conduit can then be calculated using the following equation:

Flow=$(c_W - c_A)/2$

It is further contemplated that the speed of sound ($c_{SOS}$) within the conduit can then be calculated by using the following equation:

$c_{SOS} = (c_W + c_A)/2$

EXAMPLES

In one experimental example, an exemplary system as described herein was tested with the following parameters: sample rate (SR)=10000 Hz; speed ($c_{SOS}$)=350 m/s; and conduit diameter ($r_w$)=1 inch (0.02540 m). Given these parameters, the ideal separation between adjacent transducers was calculated to be 0.0350 m, according to the following calculation: $z_{min}$=(350 m/s)/(10000 Hz)=0.0350 m. However, for ease of construction, the array of transducers was built with a 2.000" (0.05080 m) separation between adjacent transducers. Given the sample rate, it was assumed that frequencies above 5000 Hz would not propagate in the fluid contained within the conduit.

Given the design parameters discussed above, the exemplary system was tested. Sound at frequencies ranging from 500 Hz to 5000 Hz was introduced into the conduit from Left to Right, and the methods described herein were applied to acquire the following 2DFFT data in FIG. 7. The speed of sound of the fluid was 347 m/s. Using the CBPSM wave equation described herein, a theoretical surface was simulated for 347 m/s over the same frequency range. This theoretical surface is displayed in FIG. 2. The contour plot in FIG. 9 clearly illustrates the presence of the off diagonal frequencies not modeled in conventional systems, such as those described in U.S. Pat. No. 7,725,270. The off diagonal elements in the contour plot were perfectly modeled by the equation resulting from the roots of the first derivative of the zeroth order Bessel function $$\left(\frac{f}{c} - k\right) = \frac{\pm \zeta_i}{M_{cal} 2\pi r_w}.$$

As shown in FIGS. 10-12, similar experiments were performed for Right to Left sound waves moving at 347 m/s. In both cases (Left to Right and Right to Left), there was a clear presence of the reflected wave. As shown, the wave number axis is beyond the Nyquist limit and entered into what can be considered the negative wavenumber region.

The next set of data, depicted in FIGS. 13-15, was for sound waves propagating from Left to Right and Right to Left. The real 2DFFT data in FIG. 13 reveals the reason for keeping the data beyond the Nyquist limit—the Bessel function impacts both the positive and the negative wave number quadrants.

The processing steps disclosed herein were performed on the data in FIG. 13. In order to perform these steps, a set of theoretical surfaces for Left to Right propagating speeds and Right to Left propagating speeds were generated using the CBPSM wave equation disclosed herein. For this exercise, a propagating flow range from 300 m/s to 400 m/s was created for both directions in steps of 1.0 m/s, representing a basis set of 10,000 (100×100) surfaces. Correlation for each of these surfaces with respect to the 2DFFT data collected for the surface in FIG. 13 is shown in FIGS. 16 and 17.

The data in FIG. 13 was collected for a zero velocity flow of the fluid. Hence, it was expected that the two propagating sound waves would have the same propagation speed. It can be clearly seen in FIG. 17 that maximum correlation occurred at 347 m/s for both axes.

The same algorithm was then applied to a fluid with a non-zero flow velocity. The data displayed in FIGS. 18 and 19 were acquired for a fluid with a velocity flow of 5.5 m/s and a speed of sound of 347 m/s.

From FIG. 19, the propagating speed with the fluid flow was found to be 352 m/s, and the propagating speed against the fluid flow was found to be 341 m/s. Using the formulas disclosed herein, these parameters corresponded to a flow velocity of 5.5 m/s and a speed of sound of 346.5 m/s, which agreed very well with the input parameters.

A higher flow was modeled in FIGS. 20 and 21. From FIG. 21, the propagating speed with the fluid flow was found to be 355 m/s, and the propagating speed against the fluid flow was found to be 338 m/s. Using the formulas disclosed herein, these parameters corresponded to a flow velocity of 9.0 m/s and a speed of sound of 346.5 m/s, which agreed very well with the input parameters.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. A system for measuring the superposition of a plurality of sound waves propagating within a conduit containing a fluid, the conduit having a longitudinal length, wherein the fluid flows through the conduit in a flow direction, and wherein at least one sound wave of the plurality of sound waves is generated by the fluid flowing through the conduit, the system comprising:

a plurality of transducers positioned substantially parallel to the flow direction along at least a portion of the longitudinal length of the conduit, wherein each transducer of the plurality of transducers comprises means for sensing the velocity of fluid flow through the conduit in the flow direction, wherein each transducer of the plurality of transducers further comprises means for sensing the speed at which the plurality of sound waves are propagating through the fluid, and wherein each transducer of the plurality of transducers is positioned in a spaced position relative to a predetermined reference point on the conduit, the spaced position corresponding to the longitudinal distance between the transducer and reference point;

means for modeling the superposition of the plurality of sound waves as they propagate within the conduit, wherein the means for modeling the superposition is in communication with each transducer of the plurality of transducers, and wherein the means for modeling the superposition is configured to:

receive a time domain signal from each transducer;

assign a position value to the time domain signal indicative of the spaced position of the transducer which generated the time domain signal; and store an array of time domain signals and their corresponding position values, wherein, upon storage of a selected number of time domain signals, the means for modeling the superposition is configured to process the array of time domain signals to produce a model of the phases of the plurality of sound waves as they propagate therein the conduit, and wherein the superposition of the plurality of sound waves is modeled using the wave equations $$\Psi_{RL}(r, z, t) = NJ_0\left(M_{cal} 2\pi r_w \left(\frac{f}{c} - k\right)\right) e^{2\pi i(ft + kz)},$$

and

-continued $$\Psi_{LR}(r, z, t) = NJ_0\left(M_{cal}2\pi r_w\left(\frac{f}{c} - k\right)\right)e^{2\pi i(ft-kz)}$$

where:
$\Psi$=the phase of the wave moving right-to-left (RL) or left-to-right (LR) through the conduit,
$r_w$=the radius of the conduit,
z=the horizontal position of the wave measured relative to the direction of fluid flow within the conduit,
t=elapsed time since generation of the wave,
N=amplitude of the sound wave,
$J_0$=cylindrical Bessel function of the first kind,
$M_{cal}$=calibration coefficient,
f=frequency of the sound waves,
c=speed of the sound waves within the conduit, and
k=the wavenumber associated with the sound waves, and
wherein the means for modeling the superposition of the plurality of sound waves as they propagate within the conduit further generating correlation information from the model to display features of the fluid flowing through the conduit.

2. The system of claim 1, wherein the means for modeling the superposition is configured to:
generate a frequency domain signal associated with each transducer;
form a two-dimensional time- and space-domain matrix for the plurality of transducers comprising the time- and frequency-domain signals associated with each respective transducer;
perform a two-dimensional fast Fourier transform (2DFFT) on the two-dimensional time- and space-domain matrix; and
correlate the results of the 2DFFT with the results modeled by the wave equations.

3. The system of claim 2, wherein the means for modeling the superposition is configured to identify the maximum correlation between the results of the 2DFFT and the results modeled by the wave equations.

4. The system of claim 3, wherein, based upon the maximum correlation between the results of the 2DFFT and the results modeled by the wave equations, the means for modeling the superposition is configured to calculate the sound propagation in the direction of fluid flow and the sound propagation against the direction of fluid flow within the conduit.

5. The system of claim 4, wherein, based upon the calculated sound propagation within the conduit, the means for modeling the superposition is configured to calculate at least one of the velocity of fluid flow and the speed of sound within the conduit.

6. The system of claim 1, wherein the time domain signal associated with each transducer is indicative of the sensed velocity of fluid flow through the conduit in the flow direction and the sensed speed at which the sound waves are propagating through the fluid.

7. The system of claim 2, wherein the means for modeling the superposition is further configured to:
perform a one-dimensional fast Fourier transform (1DFFT) on the time domain signal acquired from each respective transducer; and
generate a normalized time domain signal for each respective transducer,
wherein the normalized time domain signal is included in the two-dimensional time- and space-domain matrix.

8. The system of claim 1, wherein plurality of sound waves comprises a first sound wave and a second sound wave.

9. The system of claim 1, wherein the plurality of transducers comprises 2 transducers.

10. The system of claim 1, wherein the plurality of transducers comprises at least 64 transducers.

11. The system of claim 1, wherein the plurality of transducers comprises at least 128 transducers.

12. The system of claim 1, wherein each transducer of the plurality of transducers is longitudinally spaced from adjacent transducers by a separation length.

13. The system of claim 12, wherein the separation length ranges from about 0.5 inches to about 3.5 inches.

14. The system of claim 12, wherein the separation length ranges from about 1.0 inches to about 3.0 inches.

15. The system of claim 12, wherein the separation length ranges from about 1.5 inches to about 2.5 inches.

16. The system of claim 1, wherein the means for modeling the superposition of the plurality of sound waves comprises a computer having a processor.

17. The system of claim 16, wherein the processor comprises an analog-to-digital converter for processing the data sets received from the plurality of transducers, and wherein the analog-to-digital converter processes the data sets at a sample rate.

18. The system of claim 1, wherein the conduit comprises an external surface, and wherein the plurality of transducers are detachably mountable on the external surface of the conduit.

19. The system of claim 18, wherein the plurality of transducers are interconnected to form a substantially linear array of transducers.

20. A method for measuring the superposition of a plurality of sound waves propagating within a conduit containing a fluid, wherein the fluid flows through the conduit in a flow direction, and wherein at least one sound wave of the plurality of sound waves is generated by the fluid flowing through the conduit, the method comprising:
providing a plurality of transducers positioned substantially parallel to the flow direction along at least a portion of a longitudinal length of the conduit, wherein each transducer of the plurality of transducers comprises means for sensing the velocity of fluid flow through the conduit in the flow direction, wherein each transducer of the plurality of transducers further comprises means for sensing the speed at which the plurality of sound waves are propagating through the fluid, and wherein each transducer of the plurality of transducers is positioned in a spaced position relative to a predetermined reference point on the conduit, the spaced position corresponding to the longitudinal distance between the transducer and reference point;
receiving a time domain signal each respective transducer;
assigning a position value to the time domain signal indicative of the spaced position of the transducer which generated the time domain signal;
storing an array of time domain signals and their corresponding position values; and
processing the array of data sets to produce a model of the superposition of the plurality of sound waves as they propagate therein the conduit,
wherein the superposition of the plurality of sound waves is modeled using the wave equations $$\Psi_{RL}(r, z, t) = NJ_0\left(M_{cal}2\pi r_w\left(\frac{f}{c} - k\right)\right)e^{2\pi i(ft+kz)},$$

and $$\Psi_{LR}(r, z, t) = NJ_0\left(M_{cal}2\pi r_w\left(\frac{f}{c} - k\right)\right)e^{2\pi i(ft-kz)}$$

where:
$\Psi$=the phase of the wave moving right-to-left (RL) or left-to-right (LR) through the conduit,
$r_w$=the radius of the conduit,
z=the horizontal position of the wave measured relative to the direction of fluid flow within the conduit,
t=elapsed time since generation of the wave,
N=amplitude of the sound wave,
$J_0$=cylindrical Bessel function of the first kind,
$M_{cal}$=calibration coefficient,
f=frequency of the sound waves,
c=speed of the sound waves within the conduit, and
k=the wavenumber associated with the sound waves, and
wherein the means for modeling the superposition of the plurality of sound waves as they propagate within the conduit further generating correlation information from the model to display features of the fluid flowing through the conduit.

* * * * *